United States Patent
Yonezawa

(10) Patent No.: US 7,773,552 B2
(45) Date of Patent: Aug. 10, 2010

(54) MOBILE COMMUNICATION SYSTEM AND MOBILE COMMUNICATION METHOD

(75) Inventor: Masaaki Yonezawa, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 1027 days.

(21) Appl. No.: 11/370,975

(22) Filed: Mar. 9, 2006

(65) Prior Publication Data

US 2006/0234695 A1 Oct. 19, 2006

(30) Foreign Application Priority Data

| Mar. 9, 2005 | (JP) | P. 2005-064949 |
| Mar. 17, 2005 | (JP) | P. 2005-076524 |
| Mar. 24, 2005 | (JP) | P. 2005-085756 |

(51) Int. Cl.
*H04J 3/08* (2006.01)

(52) U.S. Cl. ............. 370/326; 370/330; 370/343

(58) Field of Classification Search ........... 370/310, 370/328, 312, 313, 326, 330, 349, 352, 389, 370/400
See application file for complete search history.

(56) References Cited

U.S. PATENT DOCUMENTS

| 7,031,275 | B1* | 4/2006 | Borella et al. ............ 370/328 |
| 7,054,613 | B2* | 5/2006 | Smeets .................... 455/410 |
| 7,082,130 | B2* | 7/2006 | Borella et al. ............ 370/389 |
| 2001/0016492 | A1* | 8/2001 | Igarashi et al. ........... 455/433 |
| 2003/0045287 | A1 | 3/2003 | Taniguchi |
| 2003/0070067 | A1 | 4/2003 | Saito |
| 2003/0093469 | A1* | 5/2003 | Ohta et al. .............. 709/203 |

FOREIGN PATENT DOCUMENTS

| JP | 2000-252983 A | 9/2000 |
| JP | 2000-295401 A | 10/2000 |
| JP | 2002-094557 B2 | 3/2002 |
| JP | 2002-271369 A | 9/2002 |
| JP | 2003069593 A | 3/2003 |
| JP | 2003101570 A | 4/2003 |
| JP | 2003-198581 B2 | 7/2003 |
| JP | 2003-216777 A | 7/2003 |
| JP | 2004-023491 A | 1/2004 |
| JP | 2005-38099 A | 2/2005 |
| JP | 2005-056247 A | 3/2005 |
| WO | 2004-014027 A2 | 2/2004 |

(Continued)

OTHER PUBLICATIONS

Chinese Office Action dated May 23, 2008.
JPO, Notification of Reason for Refusal in JP Appln. No. 2005-064949, Yokogawa Eletric Corp., Nov. 24, 2009.

(Continued)

*Primary Examiner*—Jean A Gelin
(74) *Attorney, Agent, or Firm*—Sughrue Mion, PLLC

(57) ABSTRACT

A mobile communication system includes a home agent which transfers a communication packet to a mobile communication device connected to a foreign network, an address management section which manages a plurality of IP addresses, an address generation section which assigns any of the IP addresses managed, by the address management section to the mobile communication device as a home address thereof, a server which stores the home address of the mobile communication device and specific information of the mobile communication device in association with each other, and a source node which connects with the server through a network, and transmits the communication packet to any mobile communication device having the home addresses stored in the server as a destination.

19 Claims, 24 Drawing Sheets

OTHER PUBLICATIONS

JPO, Decision of Refusal in JP Appln. No. 2005-076524, Yokogawa Electric Corp., Jan. 18, 2010.

JPO, Notification of Reason for Refusal in JP Appln. No. 2005-085756, Yokogawa Electric Corp., Jan. 18, 2010.

* cited by examiner

MOBILE COMMUNICATION SYSTEM AND MOBILE COMMUNICATION METHOD

CROSS-REFERENCE TO RELATED APPLICATIONS

This application is based upon and claims the benefit of priority from the prior Japanese Patent Applications No. 2005-064949 filed on Mar. 9, 2005, No. 2005-076524 filed on Mar. 17, 2005, and No. 2005-085756 filed on Mar. 24, 2005, the entire contents of which are incorporated herein by reference.

BACKGROUND OF THE INVENTION

1. Field of the Invention

This invention relates to a mobile communication system having a home agent for transferring a communication packet to a mobile communication device connected to a foreign network and a mobile communication method in the mobile communication system, and more particularly to a mobile communication system and a mobile communication method having high security without the need for intricate maintenance or administration.

The invention also relates to a mobile communication system and a mobile communication method for generating management information of a mobile communication device in the mobile communication system having a home agent for transferring a communication packet to a mobile communication device connected to a foreign network.

2. Description of the Related Art

FIG. 20 is a drawing to show the configuration of a mobile communication system in a related art. FIGS. 21 and 22 are drawings to show the configurations of a mobile communication device 10 and a home agent 20 shown in FIG. 20.

In FIG. 20, a home network 100 is a subnetwork to which the mobile communication device 10 (simply, the device) 10 is originally connected. A foreign network 200 is a subnetwork to which the device 10 moved from the home network 100 is actually connected. The device 10 can be carried portably and the subnetwork to which the device 10 is connected changes with a move of the device 10. A personal computer 30 is a source node and transmits and receives a communication packet to and from the device 10 to conduct communications with the device 10.

The home network 100, the foreign network 200, and the personal computer 30 are connected by Internet 300. The networks 100 and 200 are provided with routers R1 and R2, which are connected to nodes in the networks 100 and 200.

In FIG. 21, the device 10 has memory 11, an address generation section 12, and an authentication section 13, corresponds to mobile IPv6 of communication protocol (Internet Protocol Version 6), and has a mobile node function in mobile IP. Specific information to identify the device 10 (for example, identifier such as serial number) and a MAC (Media Access Control) address are stored previously (for example, at the manufacturing time, repair time, etc., of the device 10) in the memory 11 of the device 10. The address generation section 12 generates the IP address of the device 10 and stores the IP address in the memory 11. The authentication section 13 performs authentication of the node of the communicating party.

The device 10 is assigned a home address and a care of address. The home address is an address uniquely assigned to the device 10 independently of the subnetwork and is the same network address as the home network 100. The care of address is an address assigned in the foreign network 200.

In FIG. 22, the home agent 20 has memory 21, a transfer section 22, and an authentication section 23 and operates on a node in the home network 100. When the device 10 exists in the foreign network 200, the home agent 20 receives a communication packet addressed to the device 10 and references the contents of the memory 21 and the transfer section 22 transfers the communication packet to the device 10. The authentication section 23 performs authentication of the node of the communicating party.

The operation of the mobile communication system is as follows:

First, the operation of registering the device 10 in the home agent 20 will be discussed.

The user starts the home agent 20 in a node having a home agent function on the home network 100 and installs the device 10 in the home network 100. The router R1 gives a prefix (corresponding to the network address of the home network 100) to the device 10. Accordingly, the address generation section 12 of the device 10 generates the home address of the device 10 from the MAC address stored in the memory 11 of the device 10 and the given prefix, and stores the home address in the memory 11. It also stores the home address in the memory 21 of the started home agent 20. A shared key generation section (not shown) generates a first shared key and stores the first shared key in the memory 11 and the memory 21 of the device 10 and the home agent 20.

The user creates a list of recording the serial number and the home address of the device 10 in the personal computer 30, etc., to distinguish the device 10 from other devices.

Next, the operation of registering installation of the device 10 in the foreign network 200 in the home agent 20 will be discussed.

The device 10 is installed in the foreign network 200. The router R2 existing in the foreign network 200 gives a prefix (corresponding to the network address of the foreign network 200) to the device 10. Accordingly, the address generation section 12 of the device 10 generates the care of address of the device 10 in the foreign network 200 from the MAC address stored in the memory 11 of the device 10 and the given prefix, and stores the care of address in the memory 11.

The device 10 transmits a communication packet including the care of address to the home agent 20. At the time, it uses the first shared key stored in the memory 11 to indicate validity for the home agent 20. The authentication sections 13 and 23 of the device 10 and the home agent 20 perform authentication based on the first shared key. If authentication is granted, a communication packet encrypted with the first shared key is transmitted and received and the care of address in the communication packet is stored in the memory 21; the home address and the care of address of the device 10 are associated with each other for registration in the memory 21.

Next, the operation of transmission of a communication packet from the personal computer 30 to the device 10 connected to the foreign network 200 will be discussed.

The user searches the list for the home address of the device 10 with the identifier of the device 10 as a keyword and enters the home address of, the device 10 in the personal computer 30. The personal computer 30 transmits a communication packet to the home address of the device 10 as the destination. The home agent 20 receives the communication packet and knows the destination of the communication packet from the correspondence between the home address and the care of address in the memory 21 and transmits the communication packet to the device 10 with the care of address as the destination. Accordingly, the communication packet transmitted from the personal computer 30 arrives at the foreign network device 10 and communications are started between the device 10 and the personal computer 30.

JP-B-3617952 and JP-B-3621917 are referred to as related art.

In the mobile communication system described above, the user uses the specific information of the device 10 to identify the device 10 of the destination from among a plurality of devices. Thus, the user needs to create a list of recording the serial number and the home address of the device 10 in the personal computer 30, etc., and needs to search the list for the home address of the device 10 from the specific information of the device 10 and enter the home address of the device 10 in the personal computer 30. That is, the list describing the correspondence between the specific information of the device 10 and the home address needs to be managed additionally.

As the number of devices 10 increases, the following problems arise: (1) the time and labor for creating the list are required accordingly; (2) the possibility that an error will occur at the list creating time is high; (3) the time and labor for searching an enormous list for the device 10 each time communications with the device 10 are conducted are required; and (4) the possibility that a setting mistake will occur when the home address obtained from the list is set in the personal computer 30 is high.

The home network 100 to which the device 10 belongs is often constructed originally by the user and the time and labor for administration, maintenance, and management of the home network 100 and the home agent 20 are required; this is a problem.

Further, a malicious third party obtaining the list can conduct communications with the device 10; this is a problem.

In the mobile communication system described above, a plurality of devices 10 are connected to the foreign network and to use the specific information of the device 10 to identify the device 10 of the destination from among a plurality of devices 10, the user additionally creates and manages a list of recording the serial number (specific information) and the home address of the device 10 in association with each other in the personal computer 30, etc. The user searches the list for the home address of the device 10 from the specific information of the device 10 and enters the home address of the device 10 in the personal computer 30, whereby communications between the specific device 10 and the personal computer 30 are conducted.

In such a configuration, as the number of devices 10 increases, the time and labor for the user to create the list are required accordingly, and there is a possibility that an error will occur at the list creating time. The number of devices 10 increases, whereby the amount of the data stored in the personal computer 30 grows and if the storage capacity of the personal computer 30 is not large, the load on the apparatus grows.

It is also necessary to search an enormous list for the device 10 each time communications with the device 10 are conducted, and the time and labor are required and when the home address obtained from the list is set in the personal computer 30, a setting mistake may occur.

To overcome such problems, it is considered that when delivering the device 10 to the user, the device provider such as the manufacturer delivers the device 10 including an external storage device 50 such as a USB recording the serial number and the home address of the device 10 in association with each other.

FIG. 23 shows a configuration example of a mobile communication system for performing authentication with an external storage device connected. Such a configuration is adopted, whereby the memory of the personal computer 30 is not consumed and thus the load on the apparatus is decreased. A second shared key is stored in each of the delivered device 10 and the delivered external storage device 50 as shown in FIGS. 24 and 25, whereby authentication can be performed between the device 10 and the external storage device 50 and the external storage device 50 is connected to the personal computer 30, whereby the device 10 to conduct communications can be determined, so that the need for referencing the list created in the personal computer 30, etc., is eliminated and the load on the user is lightened.

In the form in which when delivering the device 10 to the user, the device provider also delivers a product stored in the external storage device 50 recording the serial number and the home address of the device 10 in association with each other, if the user purchases a large number of devices 10, as many external storage devices 50 as the number of the devices 10 are in possession of the user accordingly; it is intricate for the user to manage the external storage devices to manage a plurality of devices.

For the user, it is desirable that as management of the device 10 connected to the foreign network 200, grouping, etc., should be able to be set in response to administration. For example, to manage a plurality of devices, the user might want to group the devices-according to administration of the devices in such a manner that the devices are grouped into several blocks for management as in a first grouping example as the devices are managed for each installation area, or that to adopt a plurality of managers, devices 1 to n-1 are managed by a first manager F and devices n to N are managed by a second manager as in a second grouping example, as shown in FIG. 26.

In FIG. 23, however, such a point is not assumed. That is, the external storage devices 50 are provided in a one-to-one correspondence with the devices 10 and thus additional intricate work of listing, etc., becomes necessary for grouping, etc., to manage the devices 10.

SUMMARY OF THE INVENTION

An object of the invention is to provide a mobile communication system and a mobile communication method having high security without the need for intricate maintenance or administration.

Another object of the invention is to provide a mobile communication system for generating flexible device management information and managing a mobile communication device without the need for intricate administration.

The invention provides a mobile communication system, including:

a home agent which transfers a communication packet to a mobile communication device connected to a foreign network;

an address management section which manages a plurality of IP addresses;

an address generation section which assigns any of the IP addresses managed by the address management section to the mobile communication device as a home address thereof;

a memory device which stores the home address of the mobile communication device and an identifier of the mobile communication device in association with each other; and a source node which transmits the communication packet to a mobile communication device having the home address stored in the memory device as a destination, wherein the memory device enables to be attached to and detached from the source node.

In the mobile communication system, the address management section manages an address block.

In the mobile communication system, the home agent and the mobile communication device share a first key, the memory device and the mobile communication device share a second key, and the mobile communication device includes an authentication section which performs authentication using the first key and the second key.

In the mobile communication system, the memory device stores screen information to be displayed on a browser in the source node.

In the mobile communication system, the screen information is hypertext and includes icon information associated with the identifier of the mobile communication device.

In the mobile communication system, the mobile communication device adopts mobile IP as a communication protocol.

The invention also provides a mobile communication method in a mobile communication system including a home agent which transfers a communication packet to a mobile communication device connected to a foreign network, the mobile communication method including the steps of:

managing an address block by an address management section; assigning an IP address in the address block to the mobile communication device as a home address thereof;

storing a home address in the home agent;

storing a shared key in the mobile communication device and storing the shared key and the home address and an identifier of the mobile communication device in a memory device in association with each other;

transmitting a communication packet to the mobile communication device by a source node using the home address, the identifier, and the shared key stored in the memory device;

transferring the communication packet from the source node by the home agent; and authenticating the source node based on the shared key stored in the mobile communication device by an authentication section of the mobile communication device, and starting communications with the source node.

According to the mobile communication system and the mobile communication method, the following advantages will be obtained.

The identifier and the home address of the mobile communication device are stored in association with each other in the memory device that enables to be attached to and detached from the source node, and the IP address managed by the address management section is assigned to the home address of the mobile communication device. Accordingly, for example, if the home agent is provided in the network having the address managed by the address management section, the user need not administrate the home agent separately and further need not create a list of the identifiers and the home addresses in the source node, etc., used for transmission. Accordingly, a list creation mistake, association, a home address setting mistake in the source node, etc., can be prevented. Further, a third party not having the memory device cannot conduct communications with the mobile communication device. Therefore, high security can be provided without the need for intricate maintenance or administration.

Since only the mobile communication device and the memory device have the second shared key, information in the communication packet between the mobile communication device and the memory device becomes hard to leak or alter. Accordingly, if the administrator of the home agent differs from the administrator of the mobile communication device and the memory device, high security can be kept.

Since the memory device includes the icon information associated with the identifier of the mobile communication device, any desired identifier can be found from icon images as compared with a text list in a table format. Accordingly, any desired identifier can be easily determined and a selection mistake of the mobile communication device can be prevented.

The IP address managed by the address management section is assigned to the mobile communication device as the home address thereof, the shared key is stored in the mobile communication device and the memory device, and the identifier and the home address of the mobile communication device are stored in the memory device. The source node transmits a communication packet to the mobile communication device using the home address, the identifier, and the shared key stored in the memory device, and the home agent transfers the communication packet from the source node. Further, the authentication section of the mobile communication device authenticates the source node from the stored shared key and communications with the source node are started. Accordingly, for example, if the home agent is provided in the home network managed by the address management section, the user need not administrate the home agent separately and further need not create a list of the identifiers and the home addresses in the source node, etc., used for transmission. Accordingly, a list creation mistake, association, a home address setting mistake in the source node, etc., can be prevented. Further, a third party having no memory device cannot conduct communications with the mobile communication device. Therefore, high security can be provided without the need for intricate maintenance or administration. Since only the mobile communication device and the memory device have the shared key, information in the communication packet between the mobile communication device and the memory device becomes hard to leak or alter. Accordingly, it the administrator of the home agent differs from the administrator of the mobile communication device and the memory device, high security can be kept.

The invention also provides a mobile communication system, including:

a home agent which transfers a communication packet to a mobile communication device connected to a foreign network;

an address management section which manages a plurality of IP addresses;

an address generation section which assigns any of the IP addresses managed by the address management section to the mobile communication device as a home address thereof;

a server which stores the home address of the mobile communication device and specific information of the mobile communication device in association with each other; and a source node which connects with the server through a network, and transmits the communication packet to any mobile communication device having the home addresses stored in the server as a destination.

In the mobile communication system, the source node includes an external storage device which stores information associated with the specific information stored in the server.

In the mobile communication system, the address management section manages an address block.

In the mobile communication system, the server includes:

an HTTP server which operates in response to a request received from the source node;

a memory which stores a table in which the home address of the mobile communication device and the specific information of the mobile communication device are associated with each other; and a processing section which performs processing to display information concerning the mobile communication device selected as the destination on a browser in the source node.

In the mobile communication system, the home agent and the mobile communication device share a first key, the source node and the mobile communication device share a second key, and the mobile communication device includes an authentication section which performs authentication using the first key and the second key.

In the mobile communication system, the external storage device stores the second key in association with the specific information of the mobile communication device stored in the server, and enables to be attached to and detached from the source node.

In the mobile communication system, the authentication section performs authentication using a third key shared by the source node and the server.

In the mobile communication system, the memory stores screen information to be displayed on the browser in the source node.

In the mobile communication system, the screen information is hypertext and includes icon information associated with the specific information of the mobile communication device.

In the mobile communication system, the mobile communication device adopts mobile IP as a communication protocol.

The invention also provides a mobile communication method in a mobile communication system including a home agent which transfers a communication packet to a mobile communication device connected to a foreign network, the mobile communication method including the steps of:

managing an address block by an address management section;

assigning an IP address in the address block to the mobile communication device as a home address thereof;

storing a home address in the home agent;

storing a shared key in the mobile communication device, storing specific information including the home address of the mobile communication device in a server in association, and storing the shared key in a source node;

transmitting a communication packet to the mobile communication device by the source node using the home address and the specific information key stored in the server and the shared key stored in the source node;

transferring the communication packet from the source node by the home agent; and authenticating the source node based on the shared key stored in the mobile communication device by an authentication section of the mobile communication device, and starting communications with the source node.

According to the mobile communication system and the mobile communication method, the following advantages will be obtained.

The specific information and the home address of the mobile communication device are stored in association with each other in the server, and the IP address managed by the address management section is assigned to the home address of the mobile communication device. Accordingly, for example, if the home agent is provided in the network having the address managed by the address management section, the user need not administrate the home agent separately and further need not create a list of the specific information and the home addresses in the source node, etc., used for transmission. Accordingly, a list creation mistake, association, a home address setting mistake in the source node, etc., can be prevented.

Since only the mobile communication device and the source node have the second shared key, information in the communication packet between the mobile communication device and the source node becomes hard to leak or alter. Accordingly, if the administrator of the home agent differs from the administrator of the mobile communication device and the server, high security can be kept.

The second shared key of the source node is stored in the external storage device, whereby a third party not having the external storage device cannot conduct communications with the mobile communication device. Therefore, high security can be provided without the need for intricate maintenance or administration. The external storage device may be a device of a comparatively small capacity and it is lost, the contents of the external storage device are only the second shared key and some of the specific information corresponding to the second shared key and therefore the risk lessens.

Further, the third key is shared between the source node and the server, whereby a third party not having the third key cannot access the server. Therefore, higher security can be provided Since the table of the server includes the icon information associated with the specific information of the mobile communication device, any desired specific information can be found from icon images as compared with a text list in a table format. Accordingly, any desired specific information can be easily determined and a selection mistake of the mobile communication device can be prevented.

The IP address managed by the address management section is assigned to the mobile communication device as the home address thereof, the shared key is stored in the mobile communication device and the source node, and the home address and the specific information of the mobile communication device are stored in the server in association with each other, and the shared key is stored in the source node. The source node transmits a communication packet to the mobile communication device using the home address and the specific information stored in the server and the shared key stored in the external storage device, and the home agent transfers the communication packet from the source node. Further, the authentication section of the mobile communication device authenticates the source node from the stored shared key and communications with the source node are started. Accordingly, for example, if the home agent is provided in the home network managed by the address management section, the user need not administrate the home agent separately and further need not create a list of the specific information and the home addresses in the source node, etc., used for transmission, and a list creation mistake, association, a home address setting mistake in the source node, etc., can be prevented. Only the mobile communication device and the source node have the shared key and further the shared key of the source node is stored in the external storage device that can be attached to and detached from the source node, so that a third party not having the external storage device cannot conduct communications with the mobile communication device. Therefore, high security can be provided without the need for intricate maintenance or administration, and information in the communication packet between the mobile communication device and the memory device becomes hard to leak or alter. Accordingly, if the administrator of the home agent differs from the administrator of the mobile communication device and the memory device, high security can be kept.

The invention also provides a mobile communication system, including:

a home agent which transfers a communication packet to a mobile communication device connected to a foreign network;

an address management section which manages a plurality of IP addresses;

an address generation section which assigns any of the IF addresses managed by the address management section to the mobile communication device as a home address thereof;

an external storage device which stores device information of the mobile communication device; and a source node which transmits the communication packet to a mobile communication device having the home address included in the device information stored in the external storage device as a destination, wherein the source node includes a device information generation section which obtains device information of a plurality of mobile communication devices, selects any device information to group the selected device information, and stores the grouped device information in the external storage device.

In the mobile communication system, the device information has a home address for each mobile communication device and an identifier and appearance data associated with the home address, and is data collectively provided from an outside.

In the mobile communication system, the device information generation section includes:

an all-device support screen object which displays device information obtained by the device information generation section;

an operation device object which selects any desired device information among the displayed device information;

a manager support screen object which stores the selected device information; and a management information generation function object which controls an operation of the operation device object for the all-device support screen object and the manager support screen object, and stores the device information stored in the manager support screen object in the external storage device according to an instruction.

In the mobile communication system, the all-device support screen object lists appearance data of the obtained device information.

In the mobile communication system, the operation device object includes:

a pointing device move detection notification section which detects a move of a pointing device; and a pointing device button press detection notification section which detects a pointing device button being pressed, wherein the pointing device is moved onto the appearance data displayed on the all-device support screen object and the button is pressed to move the device information including the appearance data, so that the device information is stored on the manager support screen object.

According to the mobile communication system, the device information of a plurality of devices is inputted to a personal computer and the user selects the device information to be stored in the management external device through the device information generation section in the personal computer, so that the user can group any desired devices and the need for the user to manage a large number of external storage devices is eliminated.

Since the user need not create a list of the specific information and the home addresses in the personal computer, etc., used for transmission, a list creation mistake, association, a home address setting mistake in the source node, etc., can be prevented.

DETAILED DESCRIPTION OF THE PREFERRED EMBODIMENTS

Embodiments of the invention will be discussed with reference to the accompanying drawings.

First Embodiment

Figure 1:
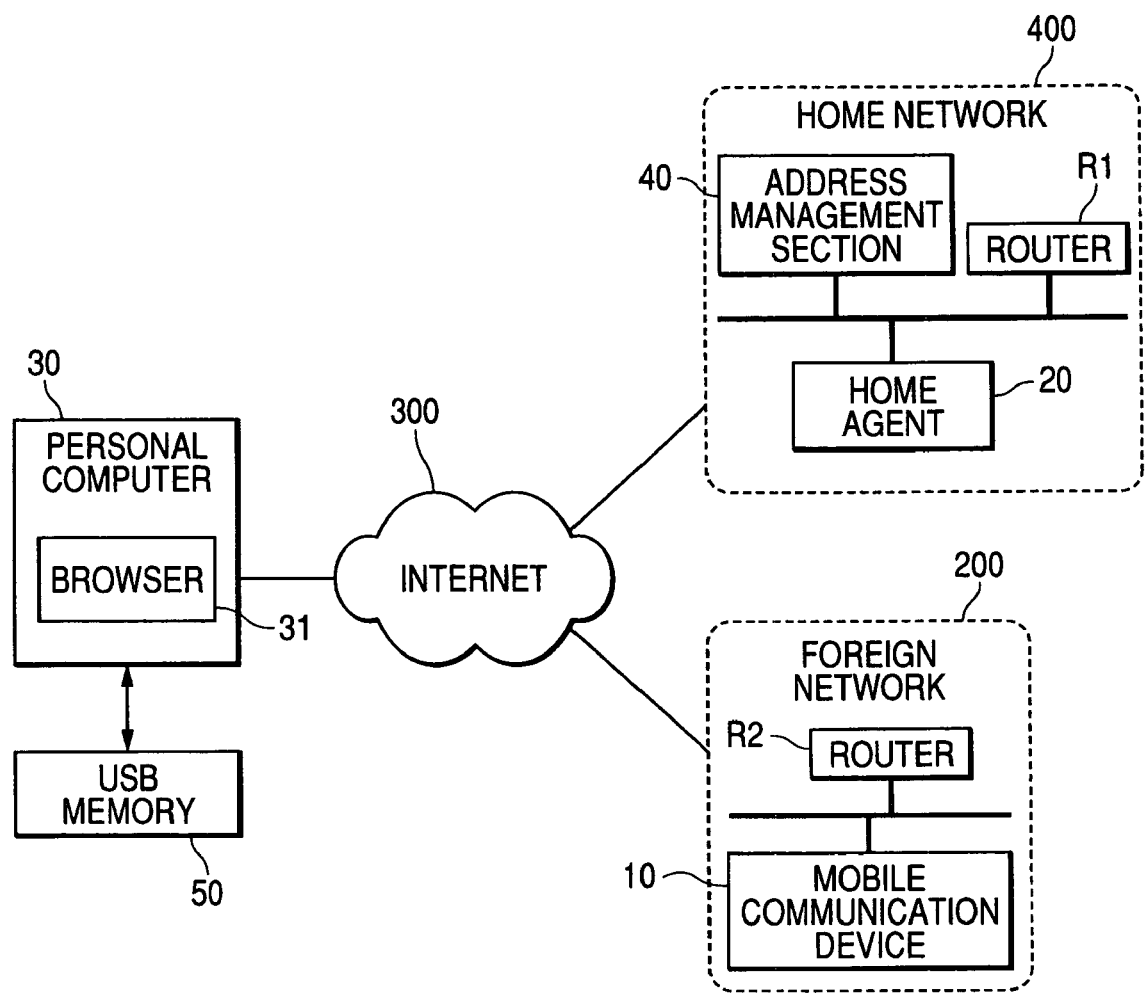
FIG. 1 is a block diagram to show a first embodiment of a mobile communication system according to the invention.
Figure 2:
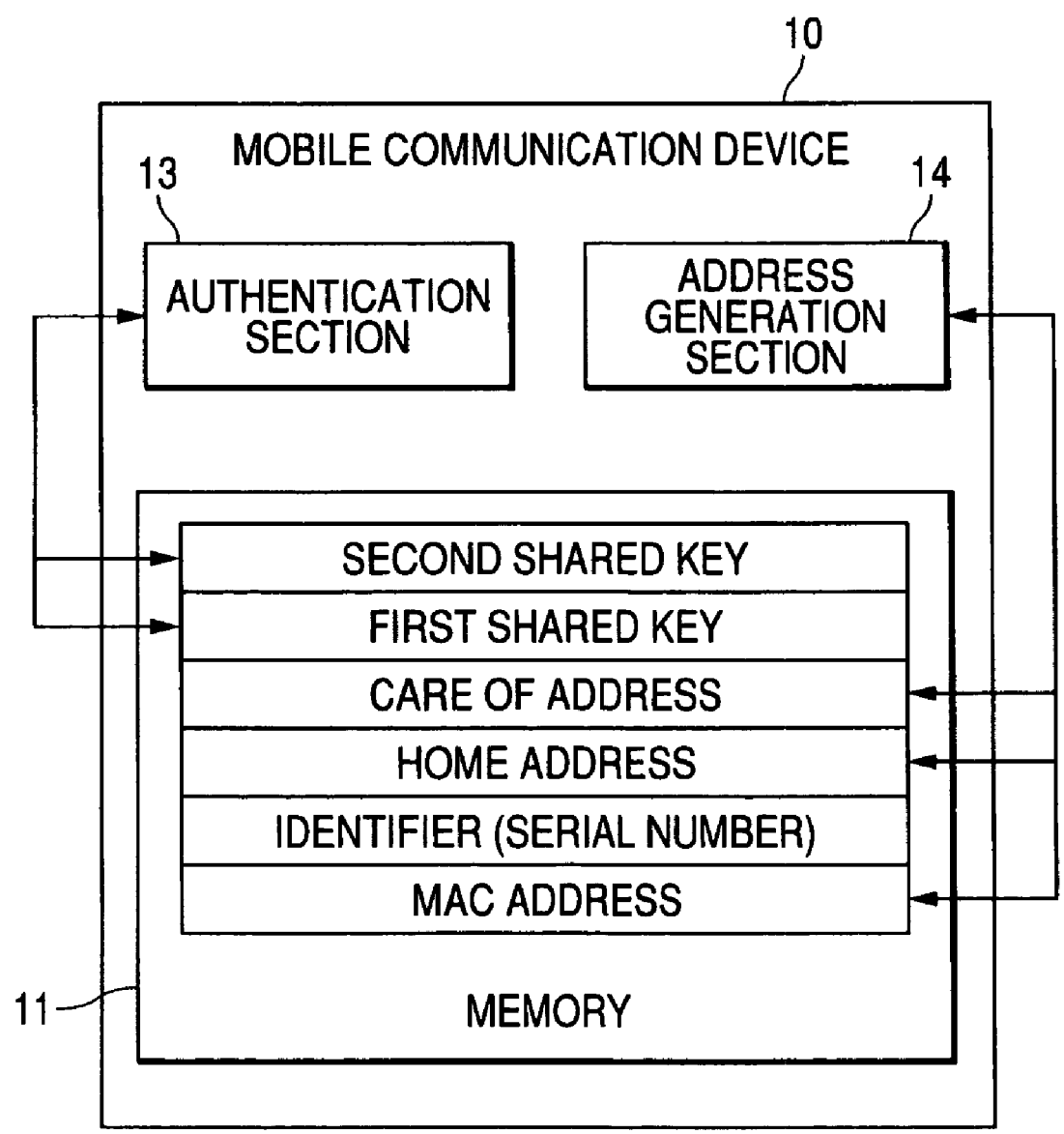
FIG. 2 is a block diagram to show an example of the mobile communication device shown in FIG. 1.
Figure 3:
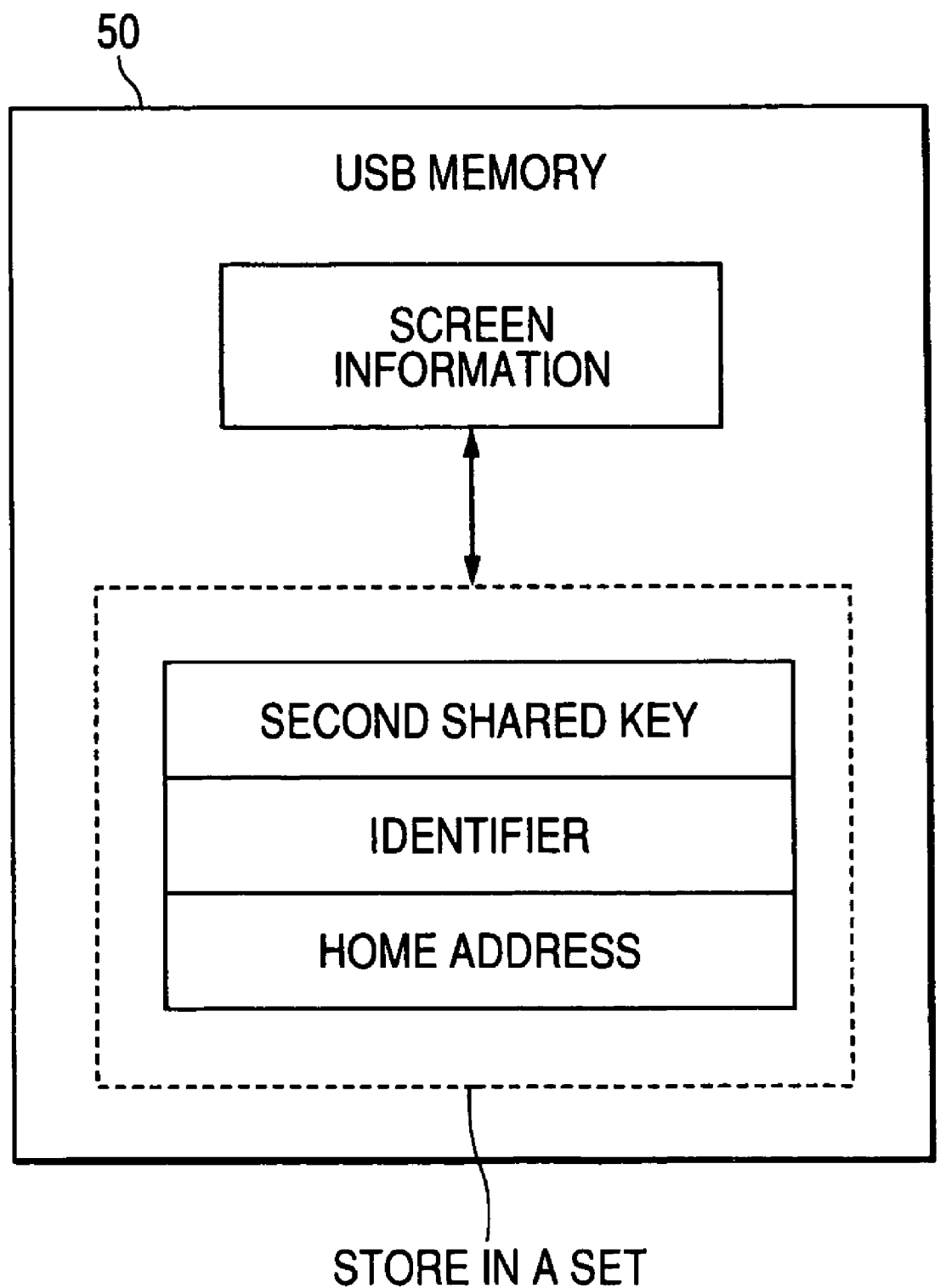
FIG. 3 is a block diagram to show an example of a USB memory shown in FIG. 1.
Figure 23:
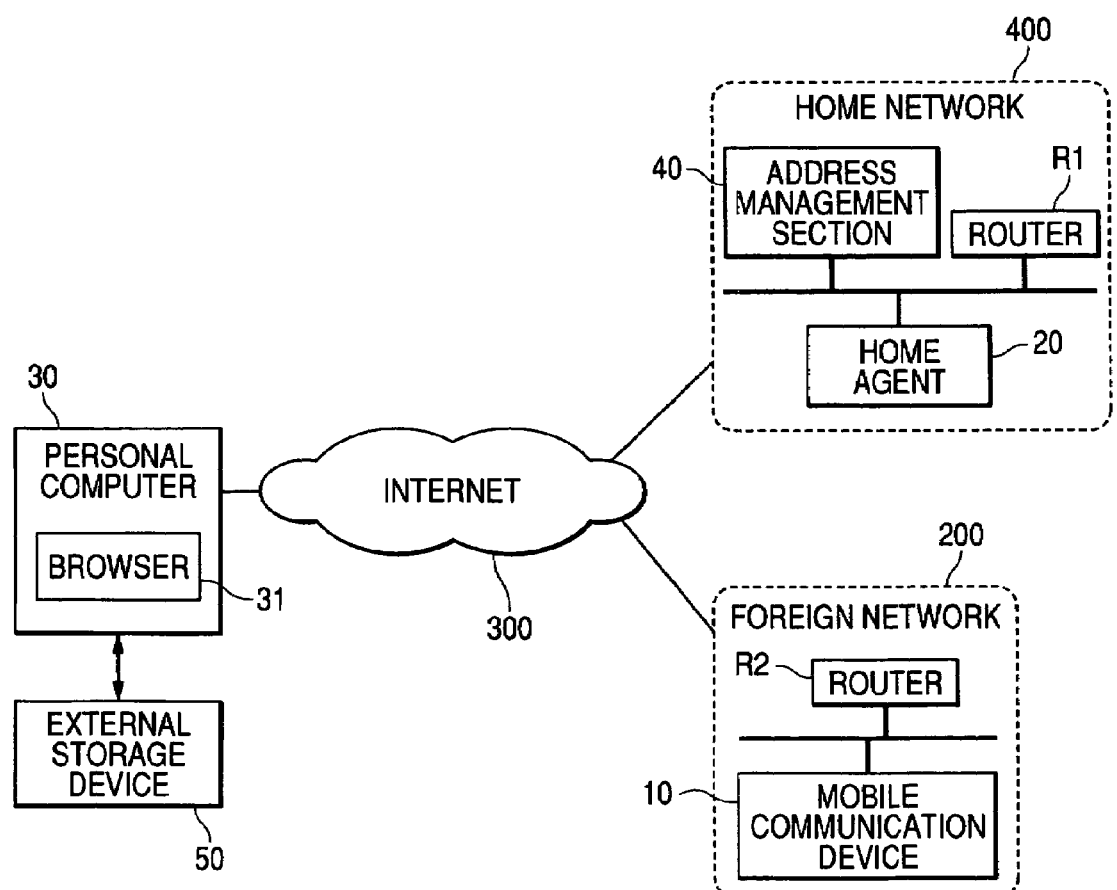
FIG. 23 is a drawing to show the configuration of the mobile communication system in another related art.
Figure 24:
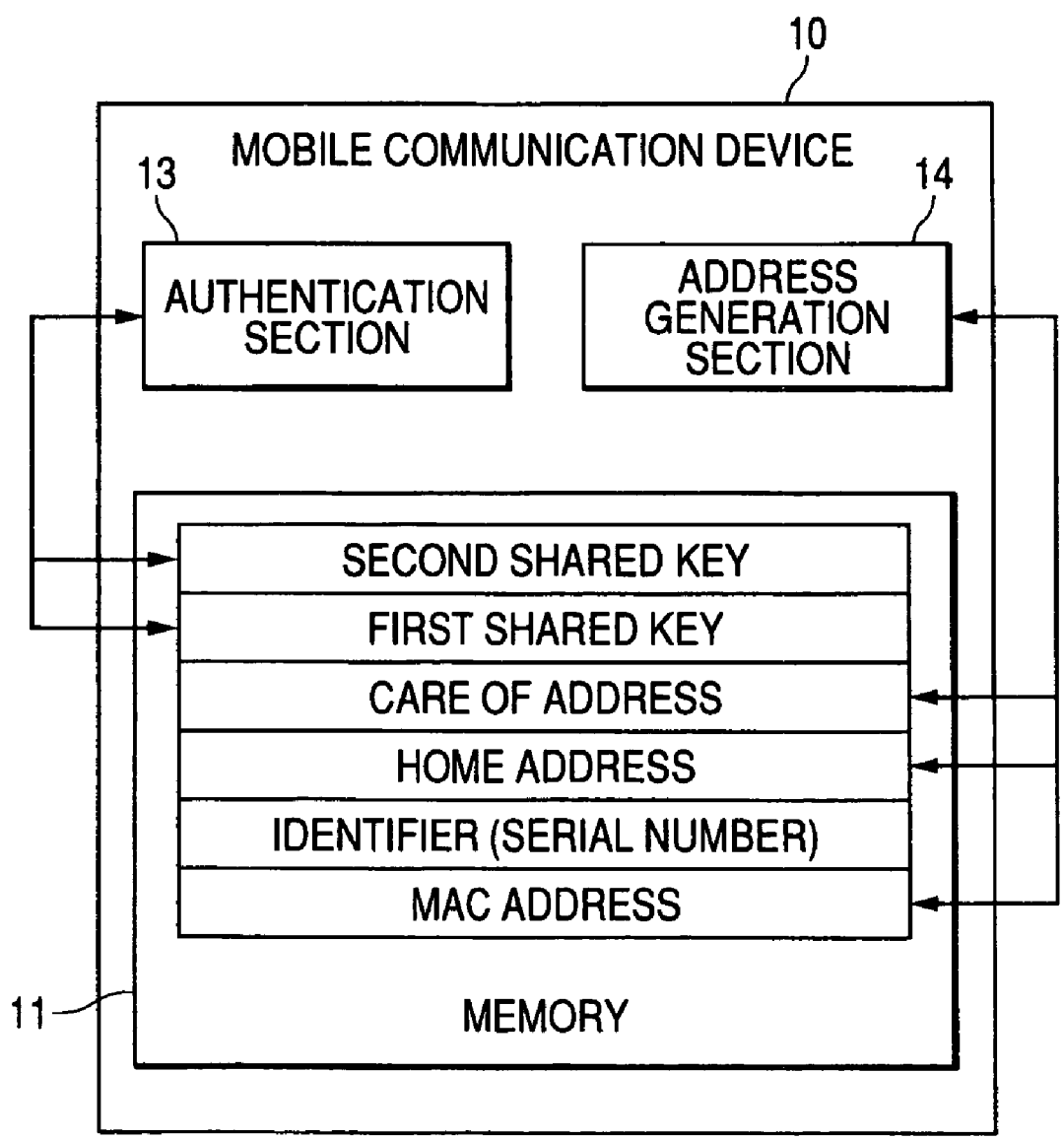
FIG. 24 is a drawing to show an operation example of the mobile communication device shown in FIG. 23.
Figure 25:
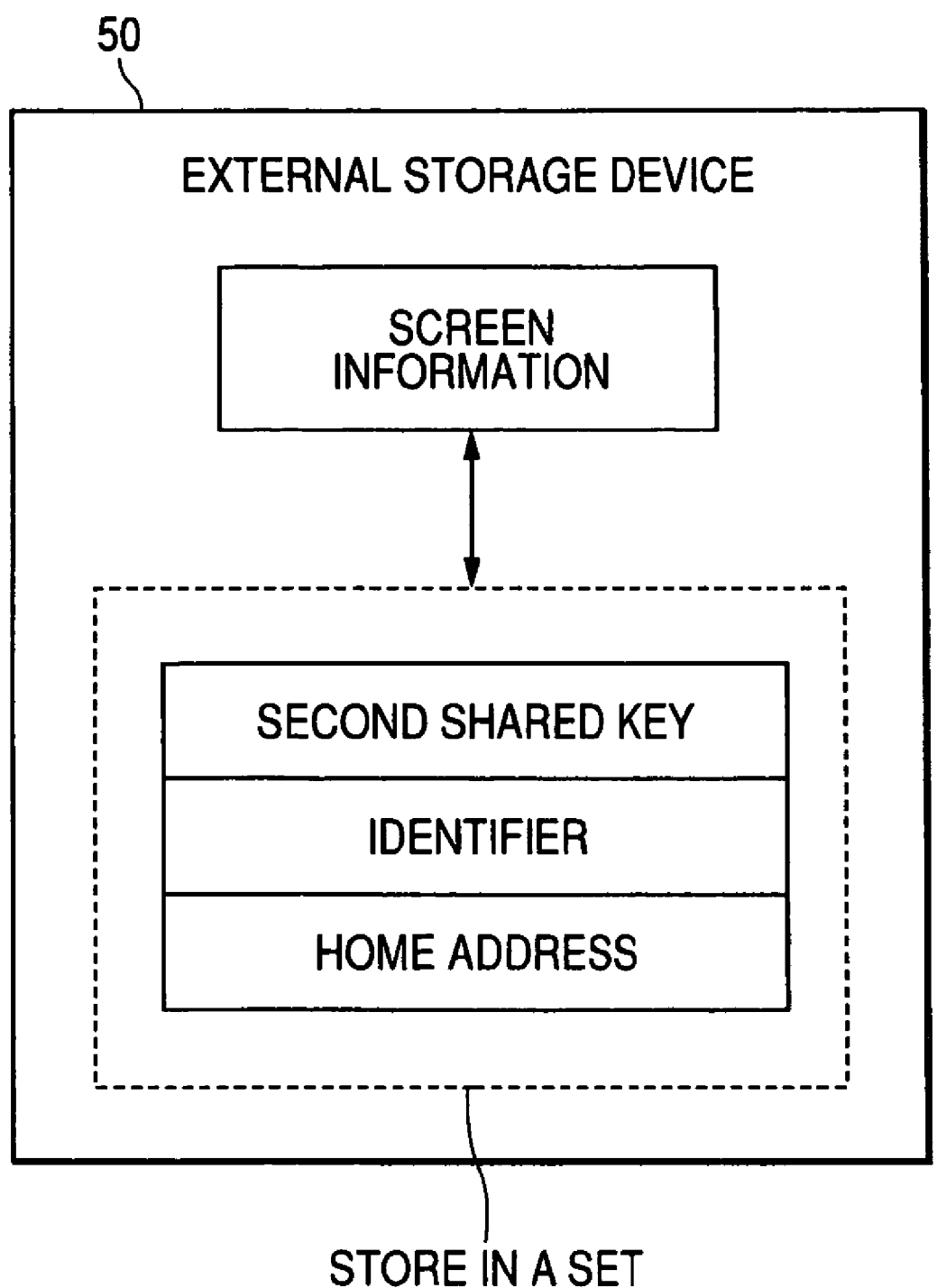
FIG. 25 is a drawing to show a configuration example of an external storage device shown in FIG. 23.
Figure 26:
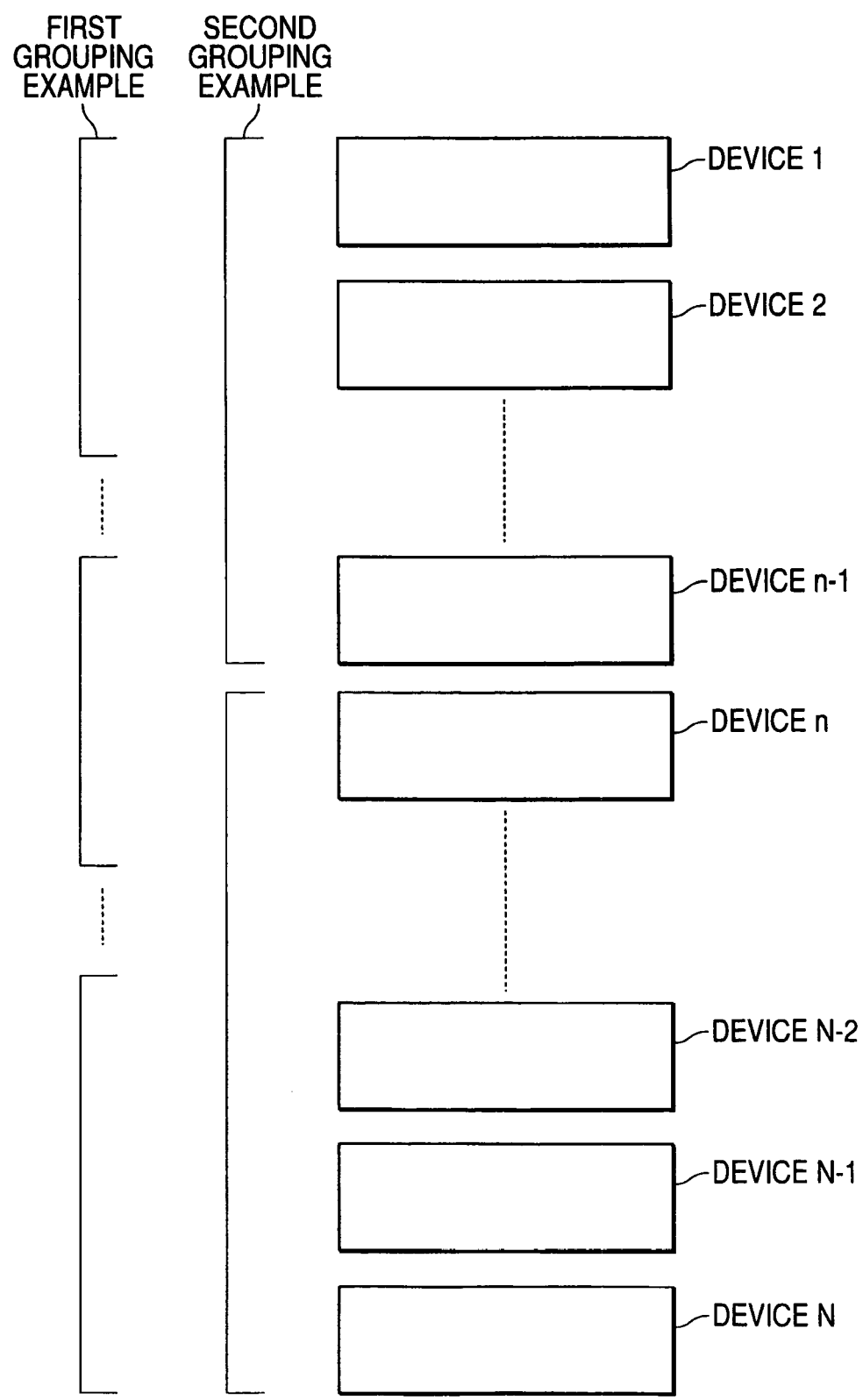
FIG. 26 is a drawing to show a state in which the user groups a plurality of devices for management.

FIG. 1 is a block diagram to show a first embodiment of the mobile communication system according to the invention. FIGS. 2 and 3 are drawings to show the configurations of a mobile communication device 10 and a USB memory 50 shown in FIG. 1. Parts identical with those in FIGS. 23 to 25 are denoted by the same reference numerals in FIGS. 1 to 3. In FIGS. 1 to 3, a home network 400 is provided in place of the home network 100. The home network 400 has a home agent 20, a router R1, and newly provided an address management section 40. The address management section 40 manages a plurality of IP addresses and, for example, manages the address block acquired by the manufacturer of a device 10 from APNIC (Asia Pacific Network Information Center). The home network 400 is the same as the network address of the address block.

The USB memory 50 that can be carried portably is newly provided. The USB memory 50 can be attached to and detached from a personal computer 30 and stores the home address and the identifier of the device 10 in association with each other. Data of a GUI to be displayed in a browser 31 operating in the personal computer 30 is stored in the USB memory 50; the data includes an HTMT format file of hypertext as screen information, icon information different in shape for each serial number, and the like. The HTMT format file also includes hyperlink information to the home address of the device 10. The USB memory 50 is a kind of memory device.

An address generation section 14 is provided in place of the address generation section 12 of the device 10. The address generation section 14 assigns any of the IP addresses managed by the address management section 40 to the device 10 as the home address and stores the address in memory 11.

Figure 4:
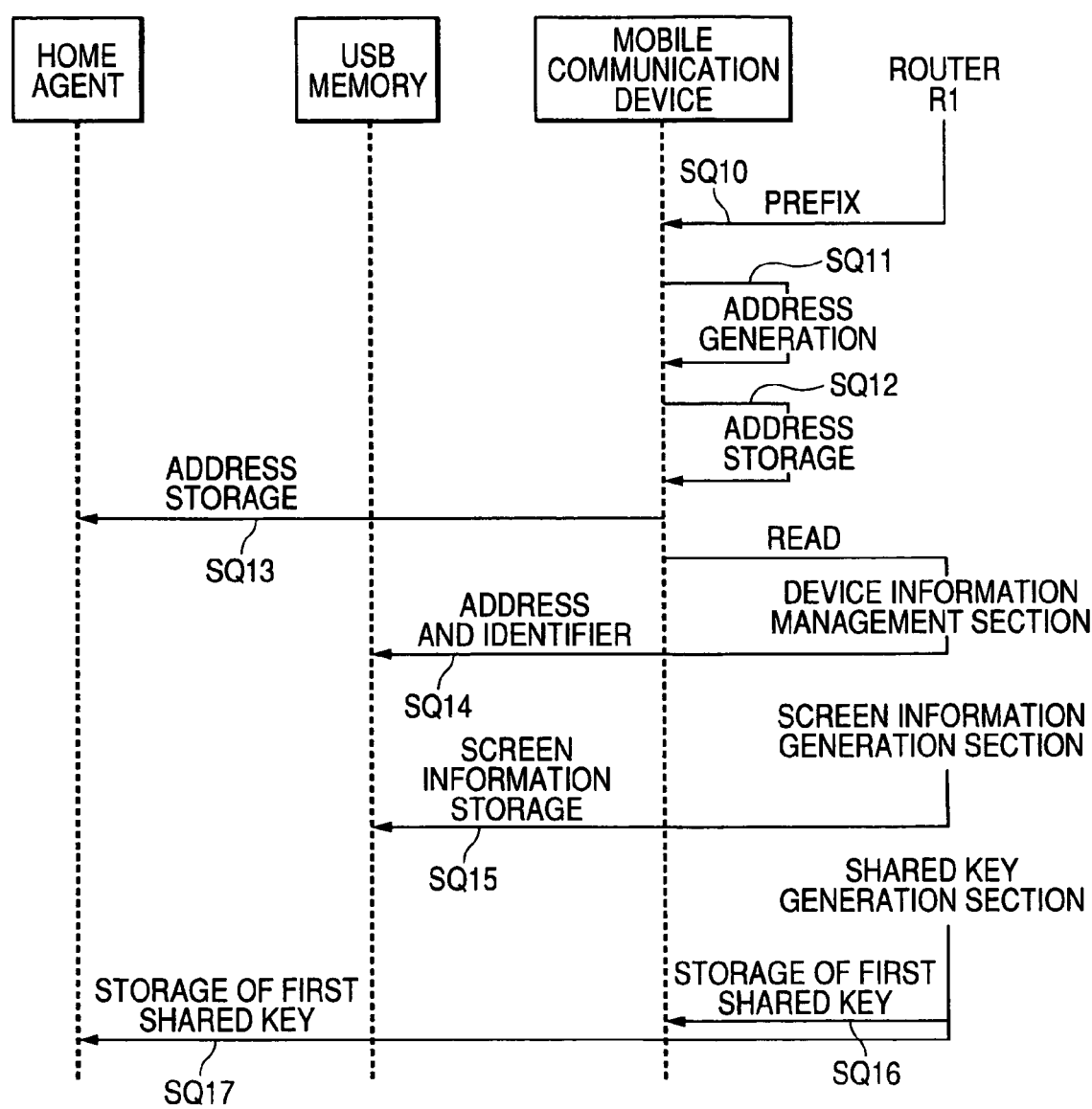
FIG. 4 is a chart to show an operation example of the mobile communication system shown in FIG. 1.

The operation of the mobile communication system is as follows:

First, the operation of registering the device 10 in the home agent 20 will be discussed with FIG. 4. The manufacturer of the device 10 starts the home agent 20 in a node having a home agent function on the home network 400 and installs the device 10 in the home network 400. The router R1 references the addresses managed by the address management section 40 and gives a first prefix for the home address (corresponding to the network address of the home network 400) to the device 10 (SQ10).

Accordingly, the address generation section 14 of the device 10 generates the home address of the device 10 from the MAC address stored in the memory 11 of the device 10 and the given prefix for the home address (SQ11), and stores the home address in the memory 11 and memory 21 of the stared home agent 20 (SQ12, SQ13). At this time, the home address becomes an IP address included anywhere in the address block. That is, the address generation section 14 generates the home address according to a given rule from the prefix from the router R1 and the MAC address unique to the device 10 and therefore becomes an address in the address block.

A device information management section (not shown in FIG. 1) reads the identifier and the home address stored in the memory 11 of the device 10 and stores the identifier and the home address in the USB memory 50 in a pair in association with each other (SQ14). It is advisable for the device information management section to retain and manage the device information of the read identifier and home address.

Further, for example, a screen information generation section (not shown in FIG. 1) operating in the personal computer associates the identifier and the home address of the device 10 with each other, generates an HTML format file describing the home address as the hyperlink destination, icon information representing the device, and the like, and stores them in the USB memory 50. If a plurality of pairs of identifiers and home addresses are stored in the USB memory 50, it is advisable to change the icon shape for each identifier (SQ15).

A shared key generation section (not shown in FIG. 1) generates a first shared key and stores the first shared key in the memory 11 and the memory 21 of the device 10 and the home agent 20 (SQ16, SQ17).

Figure 5:
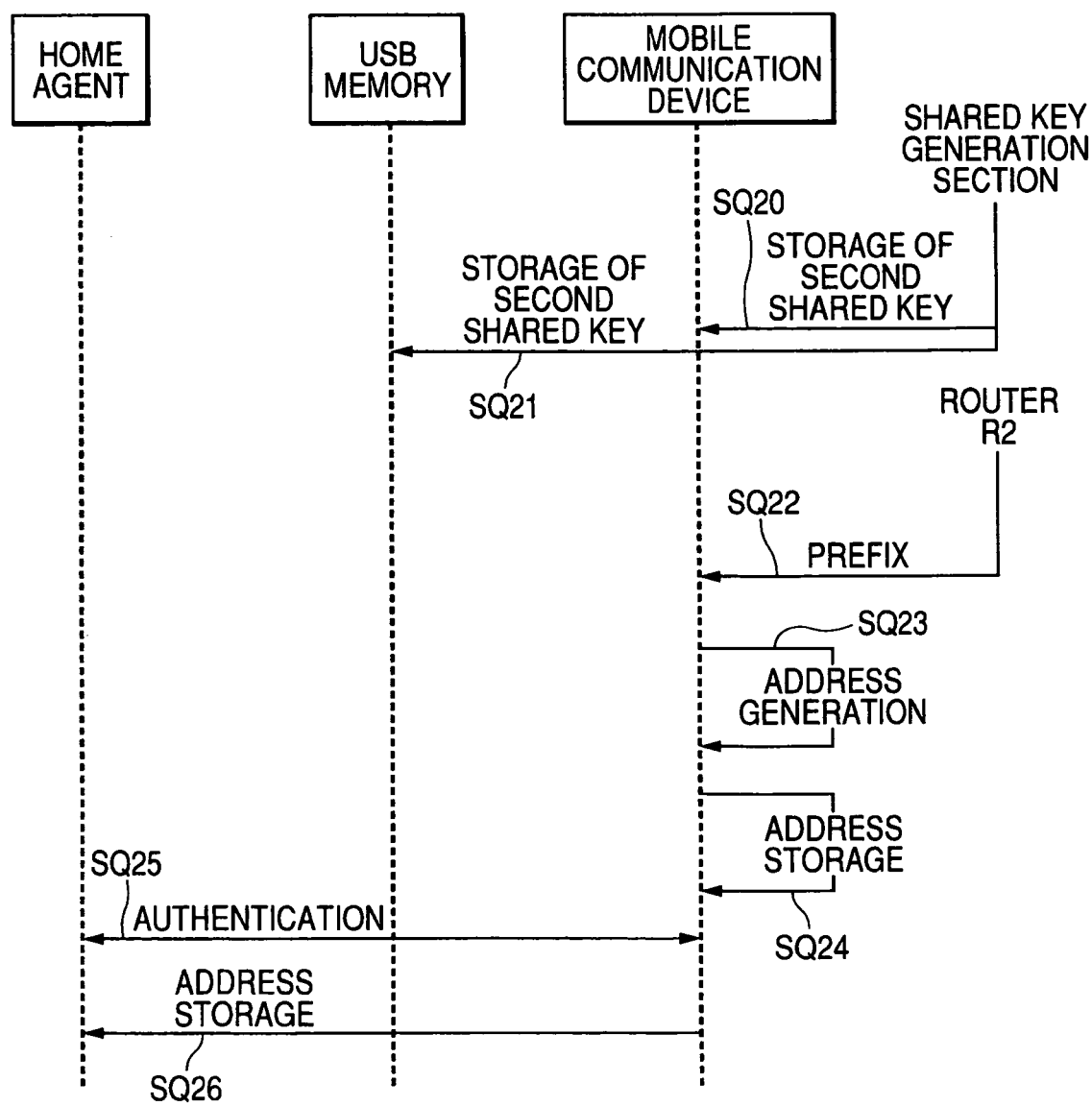
FIG. 5 is a chart to show another operation example of the mobile communication system shown in FIG. 1.

Next, the operation of registering installation of the device 10 in the foreign network 200 in the home agent 20 will be discussed with FIG. 5. The user receives the device 10 and the USB memory 50 shipped from the manufacturer. The shared key generation section (not shown in FIG. 1) generates a second shared key and stores the generated shared key only in the memory 11 of the device 10 and the USB memory 50. The identifier, the home address, and the second shared key corresponding to the device 10 are stored in a set in association with each other (SW20, SQ21).

The device 10 is installed in the foreign network 200. Further, a router R2 existing in the foreign network 200 gives a second prefix for the foreign network 200 (corresponding to the network address of the foreign network 200) to the device 10 (SQ22). Accordingly, the address generation section 14 of the device 10 generates the care of address of the device 10 in the foreign network 200 from the MAC address stored in the memory 11 of the device 10 and the given second prefix (SQ23), and stores the care of address in the memory 11 (SQ24).

The device 10 transmits a communication packet including the care of address to the home agent 20. At the time, authentication is performed. That is, the device 10 uses the first shared key stored in the memory 11 to indicate validity for the home agent 20, and an authentication section 23 of the home agent 20 performs authentication based on the first shared key in the memory 21 (SQ25). If authentication is granted, communications are started and the care of address is extracted from the communication packet received from the device 10 and is stored in the memory 21. Of course, the home address and the care of address of the device 10 are associated with each other for registration in the memory 21 (SQ26). After authentication is granted, communications are conducted as encryption and decryption are executed using the first shared key.

Figure 6:
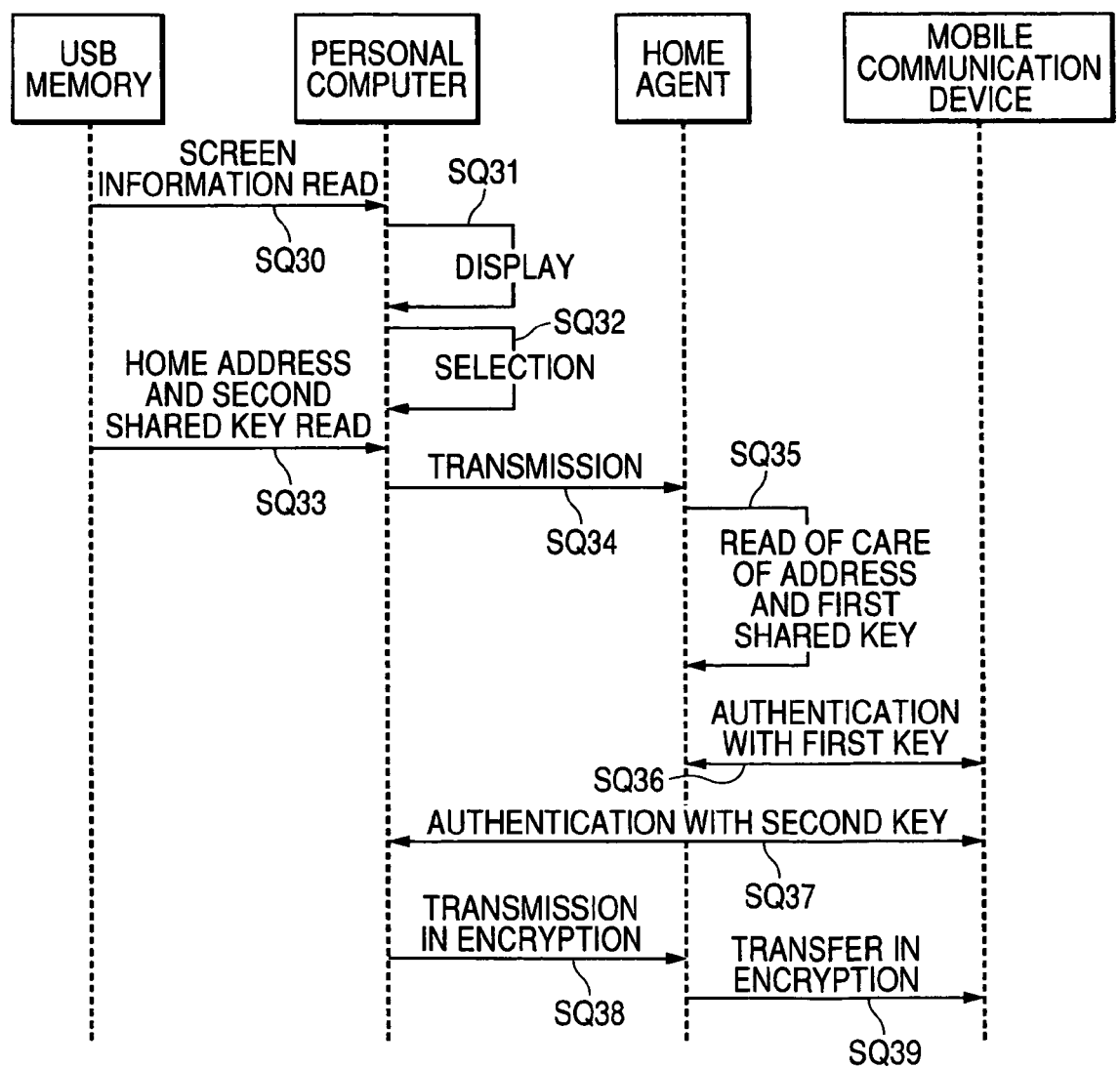
FIG. 6 is a chart to show another operation example of the mobile communication system shown in FIG. 1.

Next, the operation of transmitting a communication packet from the personal computer 30 to the device 10 connected to the foreign network 200 will be discussed with FIG. 6.

The user connects the USB memory 50 to the personal computer 30 and starts the browser 31 in the personal computer 30. The browser 31 reads the HTML format file and the icon information in the USB memory 50 (SQ30) and displays the icon including the identifier information of the device 10 along the description of the file (SQ33). If the user selects the icon indicating any desired identifier using an interface of a mouse, etc., (SQ32), the home address paired with the selected identifier is referenced according to the hyperlink described in the file (SQ33) and a communication packet is transmitted to the home address as the destination (SQ34). At this time, authentication is performed using the second shared key stored in the USB memory 50 and paired with the identifier.

The home agent 20 receives the communication packet and determines the transfer destination of the communication packet and the first shared key for authentication from the correspondence between the home address and the care of address in the memory 21 (SQ35) and the transfer section 22 transmits the communication packet to the device 10 with the care of address as the destination. The authentication section 13 performs authentication between the device 10 and the home agent 20 (SQ36).

Further, the authentication section 13 of the device 10 authenticates the personal computer 30, namely, the USB memory 50 based on the second shared key in the memory 11 and determines whether or not access to the personal computer 30 is permitted (SQ37).

After the authentication section 13 authenticates the personal computer 30 (USB memory 50), the browser 31 in the personal computer 30 encrypts the communication packet with the second shared key and transmits the encrypted communication packet (SQ38), and the home agent 20 encrypts the communication packet from the personal computer 30 with the first shared key in the memory 21. The transfer section 22 transmits the encrypted communication packet to the device 10 (SQ39).

Further, the device 10 receives the communication packet transferred from the home agent 20 and decrypts the communication packet with the first shared key and further with the second shared key. Thus, the communication packet from the personal computer 30 arrives at the device 10 existing in the foreign network 200 and communications are started between the device 10 and the personal computer 30.

Thus, the identifier and the home address of the device 10 are stored in the USB memory 50 that can be attached to and detached from the personal computer 30 in association with each other, and the IP address managed by the address management section 40 is assigned to the home address of the device 10. Accordingly, for example, if the home agent 20 is provided in the home network 400 managed by the address management section 40, the user need not administrate the home agent separately and further need not create a list of the identifiers and the home addresses in the personal computer 30, etc., used for transmission. Accordingly, a list creation mistake, association, a home address setting mistake in the personal computer 30, etc., can be prevented. Further, a third party having no USB memory 50 cannot conduct communications with the device 10. Therefore, high security can be provided without the need for intricate maintenance or administration.

Since only the device 10 and the USB memory 50 have the second shared key, information in the communication packet between the device 10 and the USB memory 50 becomes hard to leak or alter. Accordingly, if the administrator of the home agent 20 differs from the administrator of the device 10 and the USB memory 50, high security can be kept.

Since the USB memory 50 includes the icon information associated with the identifier of the device 10, any desired identifier can be found from icon images as compared with a text list in a table format. Accordingly, any desired identifier can be easily determined and a selection mistake of the device 10 can be prevented.

The invention is not limited to the embodiment and may be as follows:

The configuration wherein the home agent 20 is operated in a node different from the router R1 is shown, but the home agent 20 may be operated in the router The configuration wherein the address management section 40 is provided apart from the home agent 20 is shown, but the address management section 40 may be provided in the node where the home agent 20 operates.

The configuration wherein the second shared key is provided for the device 10 and the USB memory 50 is shown, but the second shared key need not be stored, for example, if security between the device 10 and the personal computer 30 to which the USB memory 50 is connected is guaranteed.

The configuration wherein mobile IPv6 is used as the communication protocol of the device 10 is shown, but mobile IPv4 may be used with a foreign agent installed in the foreign network 200.

The personal computer 30 may be provided with an IPv4-IPv6 tunnel means so that IPv4 is adopted for the personal computer 30 and IPv6 is adopted for the networks 200 and 400.

The configuration wherein the USB memory 50 is used as the memory device is shown, but any device (for example, a floppy (registered trademark) disk, an SD card, MO, a CD, a CF card, etc.,) may be used if it can be connected to the interface of the personal computer 30.

The configuration wherein the device information management section (not shown) reads the home address and the identifier from the memory 11 of the device 10 and stores the home address and the identifier in the USB memory 50 is shown, but the device 10 may be provided with an interface to the USB memory 50 (if another memory device is adopted, an interface to the memory device, of course) for connecting the USB memory 50 and storing the home address and the identifier directly in the USB memory 50 from the device 10.

The configuration wherein the device information management section (not shown) reads the home address and the identifier from the memory 11 of the device 10 and stores the home address and the identifier in the USB memory 50 is shown, but the identifier and the home address may be previously stored in the device information management section and may be stored in the USB memory 50. That is, the manufacturer of the device 10 would already know the identifier and the home address of the device 10 and also already know the address block of the address management section 40 and thus previously calculates and stores the address generated by the address generation section 14 of the device 10 from the prefix and the MAC address.

The configuration wherein the identifier, the home address, and the screen information are stored in the USB memory 50 before the USB memory 50 is shipped to the user is shown, but the data of the identifier, the home address, and the screen information may be sent to the user after the user receives the USB memory 50. For example, print paper of the data may be sent to the user by mail or FAX or electronic data of the identifier, the home address, and the screen information may be sent to the user. Accordingly, the flexibility, of the timing at which the data is to be sent is increased and the flexibility of management of the home agent 20 and the address block including the home address is increased. Change in the address block can also be handled flexibly and the user can also use any desired memory device.

The configuration wherein the second shared key is stored in the device 10 and the USB memory 50 after shipment is shown, but the second shared key may be stored before shipment or at shipment of the device 10 and the USB memory 50. Accordingly, the user can be saved from having to store the second shared key.

Only one personal computer 30 and one device 10 are shown in the figures, but any number of personal computers 30 and any number of devices 10 may be installed. Likewise, any number of foreign networks 200 may be installed.

Further, the configuration wherein the serial number is used as the identifier of the device 10 is shown, but any identifier may be used if it is unique. The screen information generation section may create screen information associating a different name from the identifier with the identifier. Accordingly, the user can identify the device 10 according to the name unique to the user easier to manage than the serial number.

Second Embodiment

A second embodiment of the invention will be discussed with the accompanying drawings.

Figure 7:
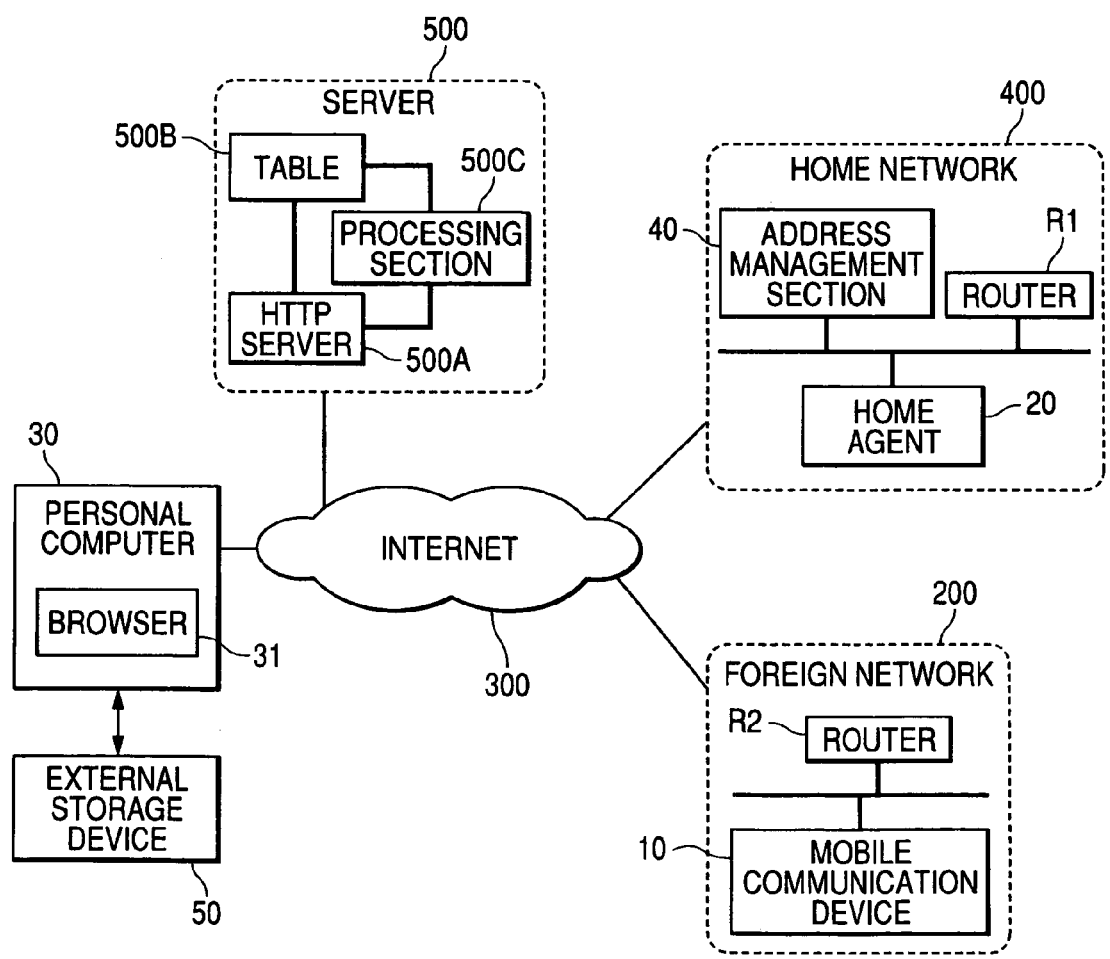
FIG. 7 is a block diagram to show a second embodiment of a mobile communication system according to the invention.
Figure 8:
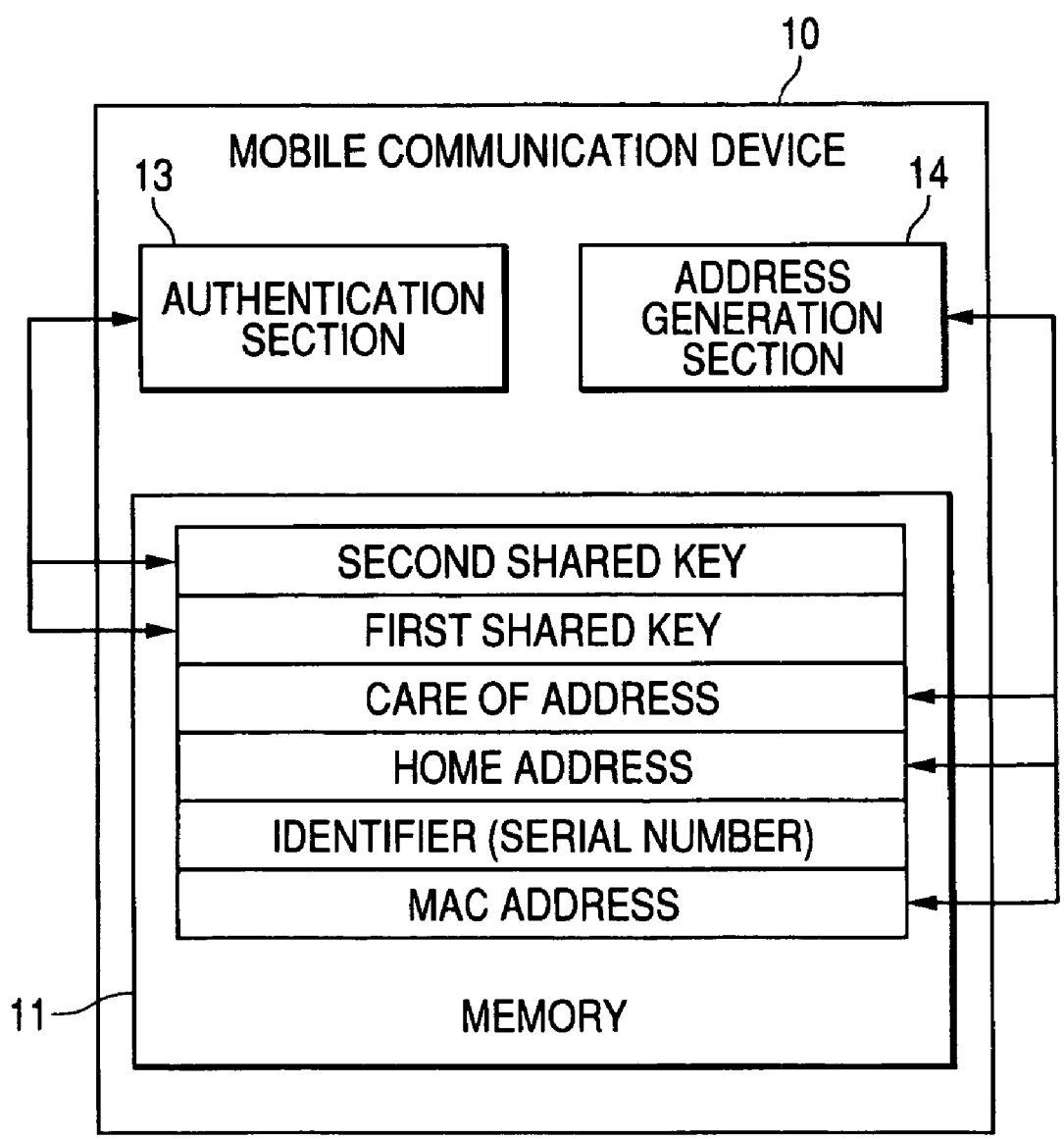
FIG. 8 is a block diagram to show an example of the mobile communication device shown in FIG. 7.
Figure 9:
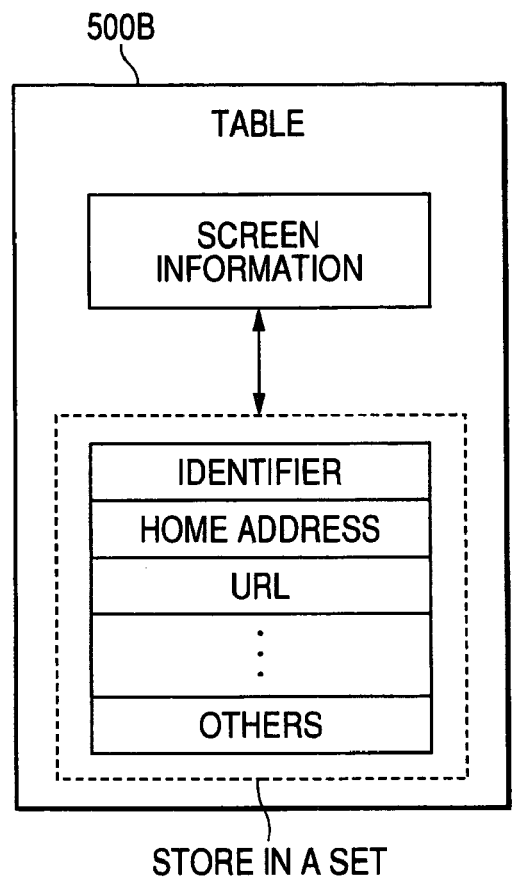
FIG. 9 is a drawing to show an example of a table in a server shown in FIG. 7.
Figure 10:
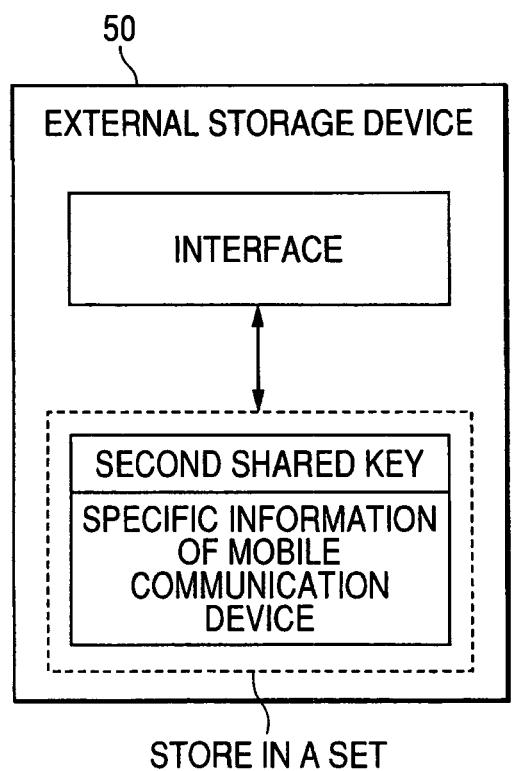
FIG. 10 is a block diagram to show an example of an external storage device shown in FIG. 7.
Figure 20:
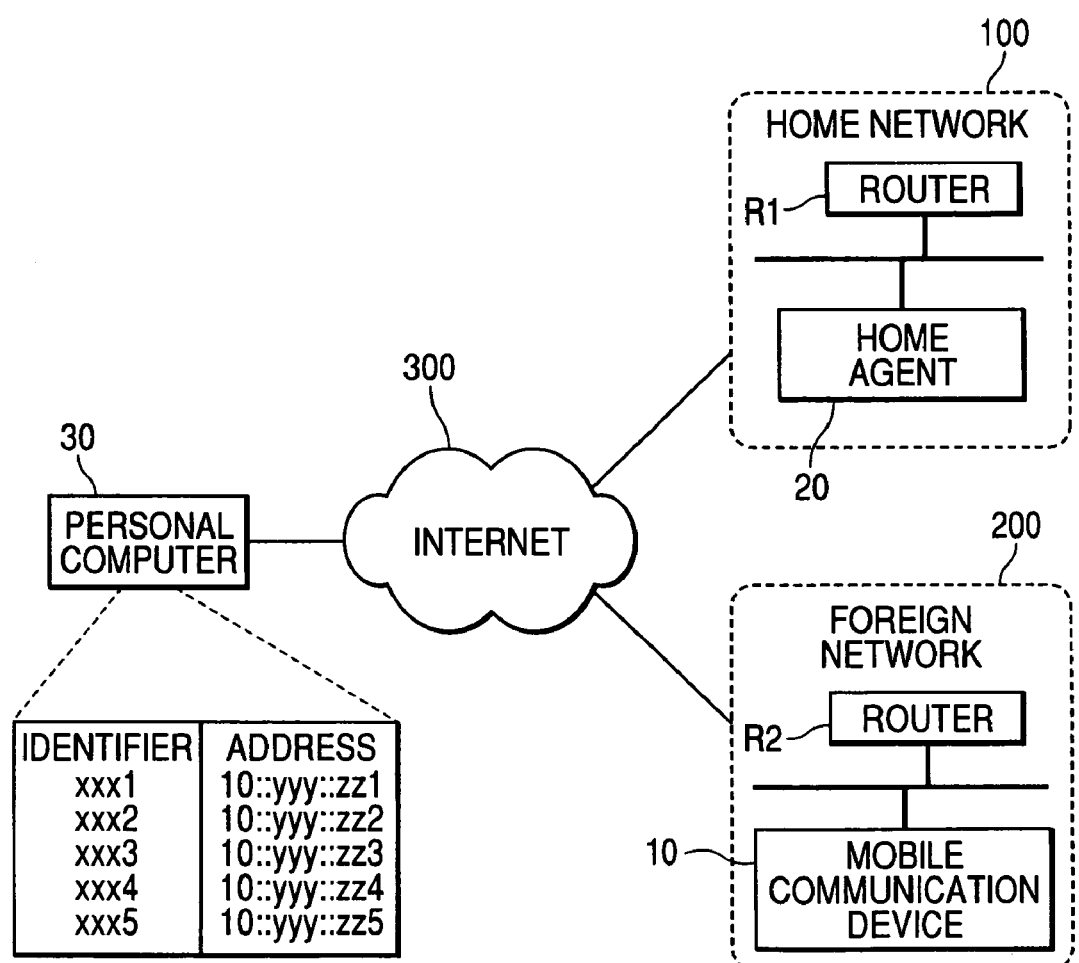
FIG. 20 is a drawing to show the configuration of the mobile communication system in a related art.
Figure 21:
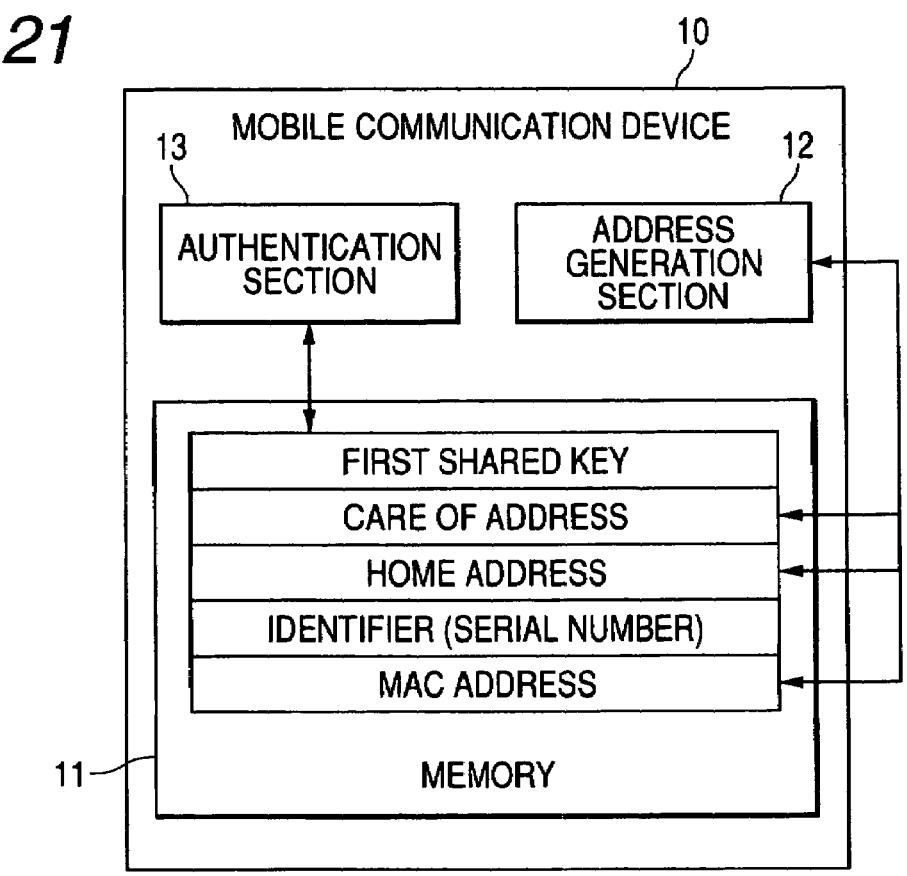
FIG. 21 is a block diagram to show an example of the mobile communication device shown in FIG. 20.
Figure 22:
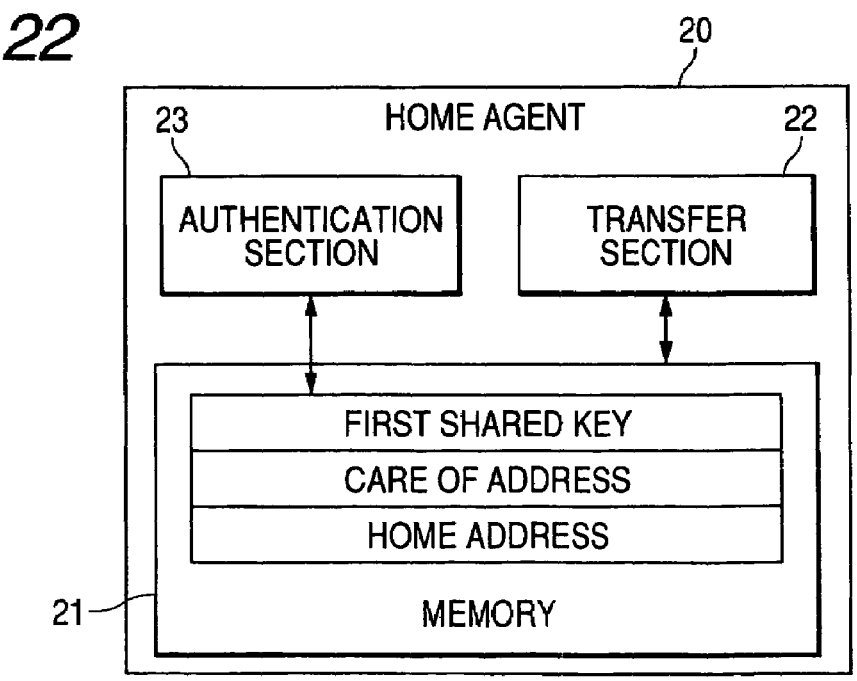
FIG. 22 is a block diagram to show an example of a home agent shown in FIG. 20.

FIG. 7 is a block diagram to show a second embodiment of a mobile communication system according to the invention. FIGS. 8, 9, and 10 are drawings to show the configurations of a mobile communication device 10, a table 500B in a server 500, and an external storage device 50 shown in FIG. 7. Parts identical with those in FIGS. 20 to 22 are denoted by the same reference numerals in FIGS. 7 to 10. In FIGS. 7 to 10, a home network 400 is provided in place of the home network 100. The home network 400 has a home agent 20, a router R1, and newly provided an address management section 40. The address management section 40 manages a plurality of IP addresses and, for example, manages the address block acquired by the manufacturer of a device 10 from APNIC (Asia Pacific Network Information Center). The home network 400 is the same as the network address of the address block.

The server 500 is connected to Internet 300 and includes an HTTP server 500A operating in response to a request received from a source node, a table 500B for storing the home address and specific information of the device 10 in association with each other, and a processing section 500C for performing processing to display information concerning the selected device on a browser in the source node.

Data of a GUI to be displayed in a browser 31 operating in a personal computer 30 is stored in the table 500B of the server 500; the data includes an HTMT format file of hypertext as screen information, icon information different in shape for each serial number, and the like. The HTMT format file also includes hyperlink information to the home address of the device 10.

The external storage device 50 that can be carried portably like USB memory is provided. The external storage device 50 can be attached to and detached from the personal computer 30 and stores the specific information of the device 10 and a second key shared with the personal computer 30 in association with each other. The specific information indicates some information in the serial number of the device, the home address uniquely given to the device 10, etc.

An address generation section 14 is provided in place of the address generation section 12 of the device 10. The address generation section 14 assigns any of the IP addresses managed by the address management section 40 to the device 10 as the home address and stores the address in memory 11.

Figure 11:
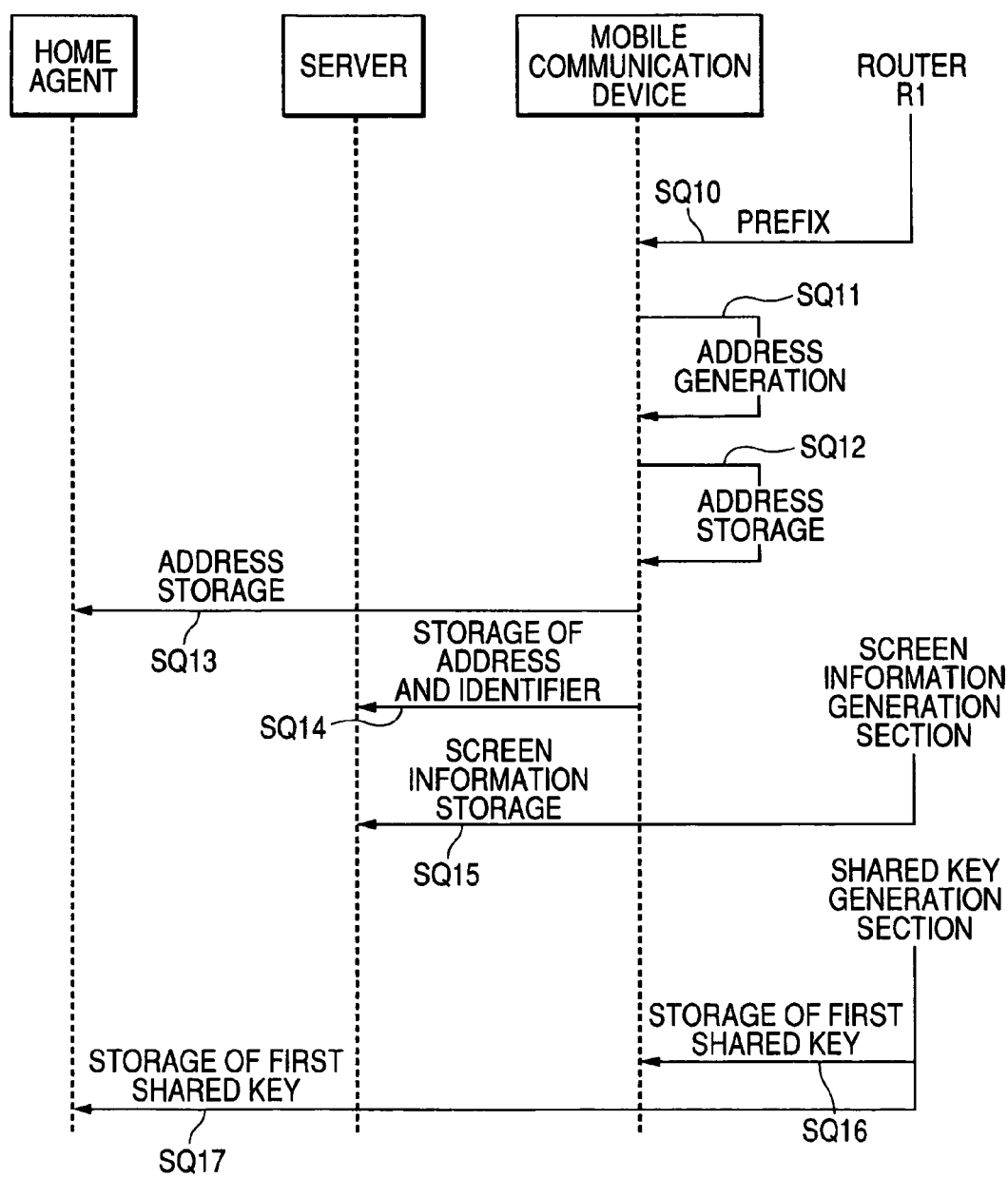
FIG. 11 is a chart to show an operation example of registering a device 10 in a home agent 20 in a system shown in FIG. 7.

The operation of the mobile communication system is as follows: First, the operation of registering the device 10 in the home agent 20 will be discussed with FIG. 11. The manufacturer of the device 10 starts the home agent 20 in a node having a home agent function on the home network 400 and installs the device 10 in the home network 400. The router R1 references the addresses managed by the address management section 40 and gives a first prefix for the home address (corresponding to the network address of the home network 400) to the device 10 (SQ10).

Accordingly, the address generation section 14 of the device 10 generates the home address of the device 10 from the MAC address stored in the memory 11 of the device 10 and the given prefix for the home address (SQ11), and stores the home address in the memory 11 and memory 21 of the stared home agent 20 (SQ12, SQ13). At this time, the home address becomes an IP address included anywhere in the address block. That is, the address generation section 14 generates the home address according to a given rule from the prefix from the router R1 and the MAC address unique to the device 10 and therefore becomes an address in the address block.

The specific information and the home address stored in the memory 11 of the device 10 are stored in the server 500 in a pair in association with each other (SQ14). Further, for example, a screen information generation section (not shown) operating in the personal computer associates the specific information and the home address of the device 10 with each other, generates an HTML format file describing the home address as the hyperlink destination, icon information representing the device, and the like, and stores them in the server 500. If a plurality of pairs of specific information and home addresses are stored in the server 500, it is advisable to change the icon shape for each piece of specific information (SQ15).

A shared key generation section (not shown) generates a first shared key and stores the first shared key in the memory 11 and the memory 21 of the device 10 and the home agent 20 (SQ16, SQ17).

Next, the operation of registering installation of the device 10 in the foreign network 200 in the home agent 20 will be discussed with FIG. 12. The user receives the device 10 shipped from the manufacturer.

The user connects the external storage device 50 to the personal computer 30. The shared key generation section (not shown) generates a second shared key and stores the generated shared key only in the memory 11 of the device 10 and the external storage device 50. Some of the specific information, the home address, and the second shared key corresponding to the device 10 are stored in the external storage device 50 in a set in association with each other (SW20, SQ21).

The device 10 is installed in the foreign network 200. Further, a router R2 existing in the foreign network 200 gives a second prefix for the foreign network 200 (corresponding to the network address of the foreign network 200) to the device 10 (SQ22). Accordingly, the address generation section 14 of the device 10 generates the care of address of the device 10 in the foreign network 200 from the MAC address stored in the memory 11 of the device 10 and the given second prefix (SQ23), and stores the care of address in the memory 11 (SQ24).

The device 10 transmits a communication packet including the care of address to the home agent 20. At the time, authentication is performed. That is, the device 10 uses the first shared key stored in the memory 11 to indicate validity for the home agent 20, and an authentication section 23 of the home agent 20 performs authentication based on the first shared key in the memory 21 (SQ25). If authentication is granted, communications are started and the care of address is extracted from the communication packet received from the device 10 and is stored in the memory 21. Of course, the home address and the care of address of the device 10 are associated with each other for registration in the memory 21 (SQ26). After authentication is granted, communications are conducted as encryption and decryption are executed using the first shared key.

Next, the operation of transmitting a communication packet from the personal computer 30 to the device 10 connected to the foreign network 200 will be discussed with FIG. 13. The user connects the external storage device 50 to the personal computer 30 and starts the browser 31 in the personal computer 30. The browser 31 reads the HTML format file and the icon information in the table 500B of the server 500 (SQ30) and displays the icon including the specific information of the device 10 along the description of the file (SQ31). If the user selects the icon indicating any desired specific information using an interface of a mouse, etc., (SQ32), the home address paired with the selected specific information is referenced according to the hyperlink described in the file (SQ33A) and a communication packet is transmitted to the home address as the destination (SQ34). At this time, authentication is performed using the second shared key stored in the external storage device 50 and paired with the specific information (SQ33B).

The home agent 20 receives the communication packet and determines the transfer destination of the communication packet and the first shared key for authentication from the correspondence between the home address and the care of address in the memory 21 (SQ35) and the transfer section 22 transmits the communication packet to the device 10 with the care of address as the destination. The authentication section 13 performs authentication between the device 10 and the home agent 20 (SQ36).

Further, the authentication section 13 of the device 10 authenticates the personal computer 30 based on the second shared key in the memory 11 and determines whether or not access to the personal computer 30 is permitted (SQ37).

After the authentication section 13 authenticates the personal computer 30, the browser 31 in the personal computer 30 encrypts the communication packet with the second shared key and transmits the encrypted communication packet to the home agent (SQ38), and the home agent 20 encrypts the communication packet from the personal computer 30 with the first shared key in the memory 21. The transfer section 22 transmits the encrypted communication packet to the device 10 (SQ39).

Further, the device 10 receives the communication packet transferred from the home agent 20 and decrypts the communication packet with the first shared key and further with the second shared key. Thus, the communication packet from the personal computer 30 arrives at the device 10 existing in the foreign network 200 and communications are started between the device 10 and the personal computer 30.

Figure 13:
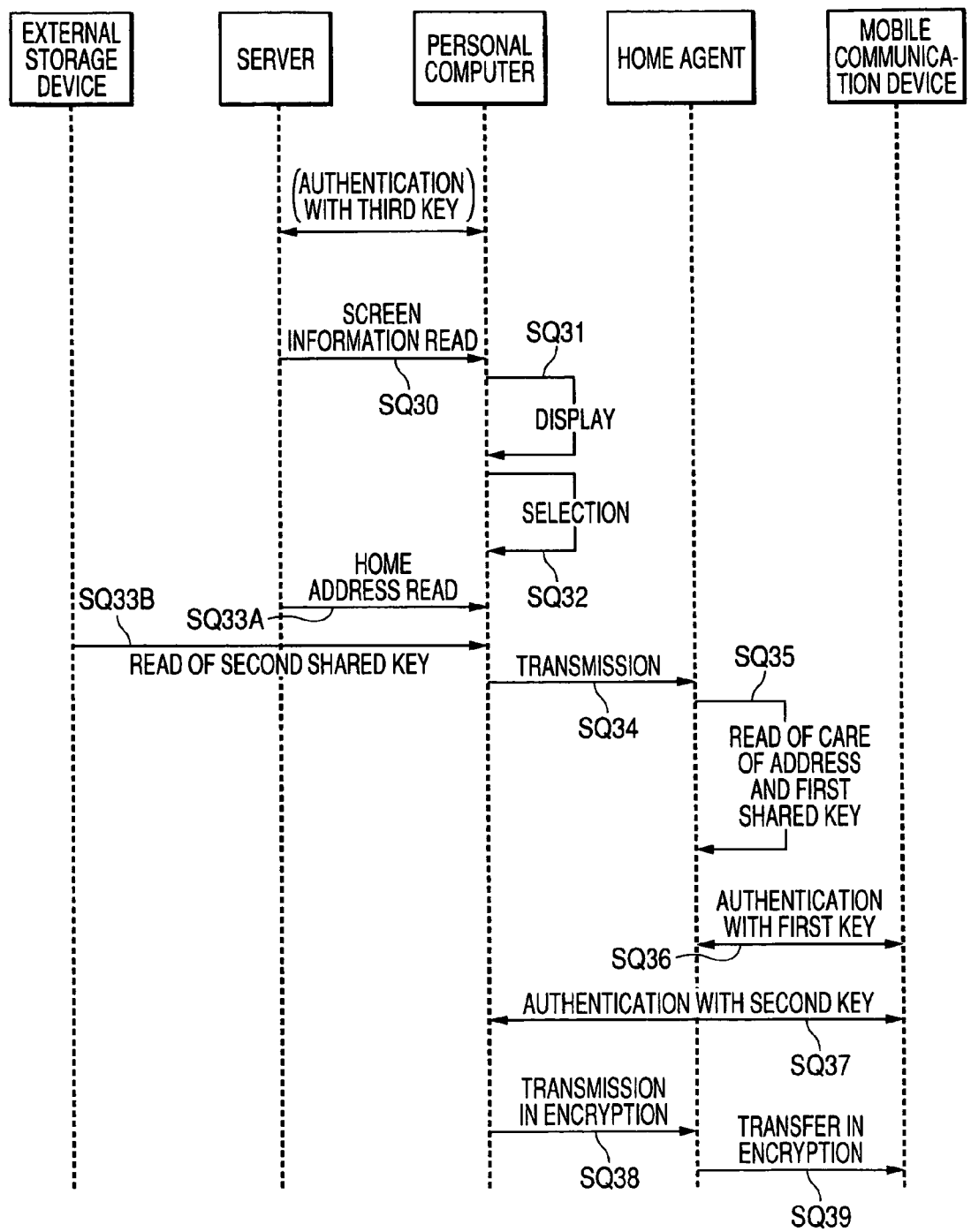
FIG. 13 is a chart to show an operation example of transmitting a communication packet from a personal computer 30 to the device 10 connected to the foreign network 200 in the mobile communication system shown in FIG. 7.
Figure 14:
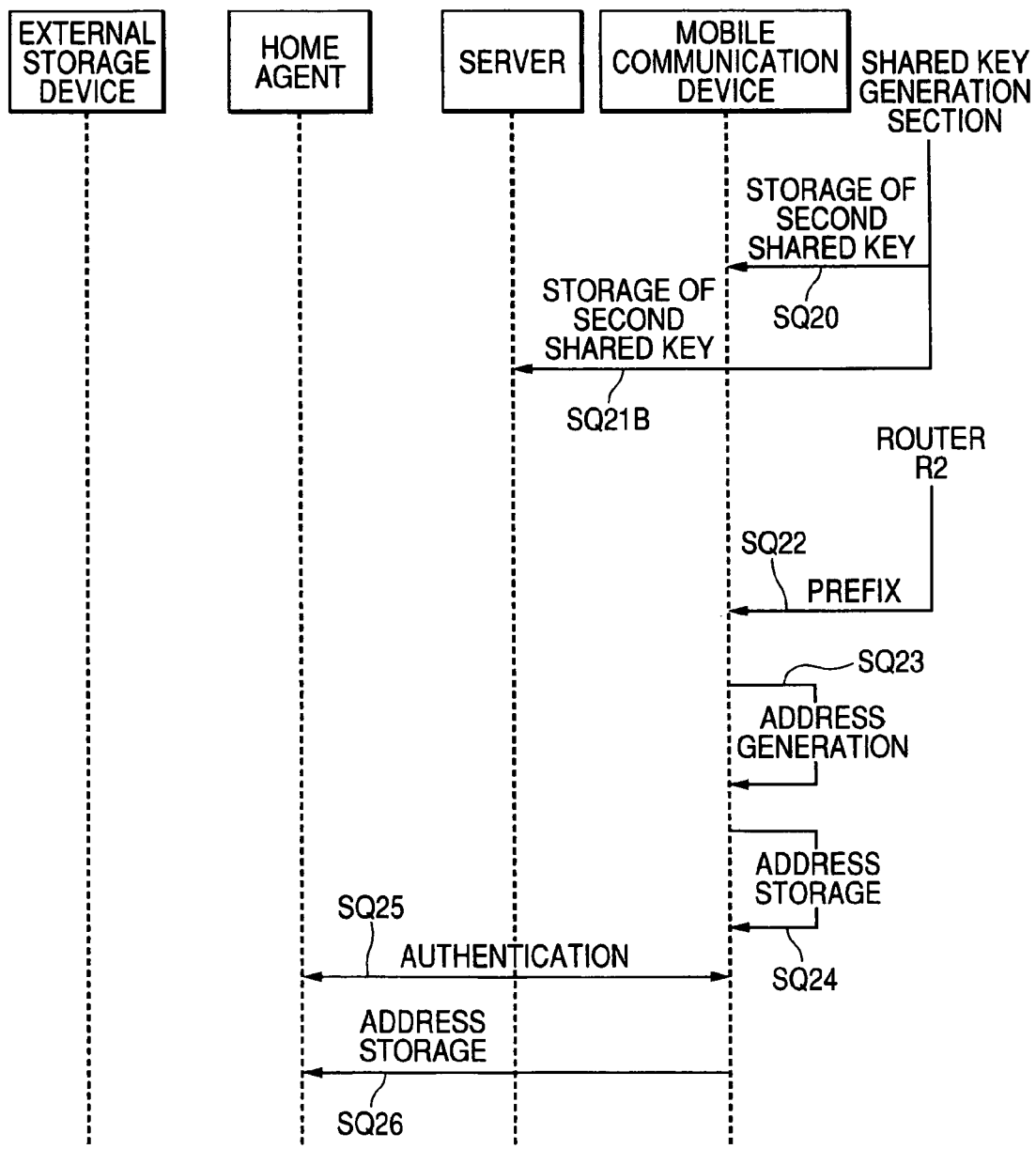
FIG. 14 is a chart to show another operation example in FIG. 12.

Authentication based on a third shared key may be performed between the personal computer 30 and the server 500 before the screen information read (SQ30) in FIG. 13. Accordingly, the access right to the server 500 can be further limited.

Figure 12:
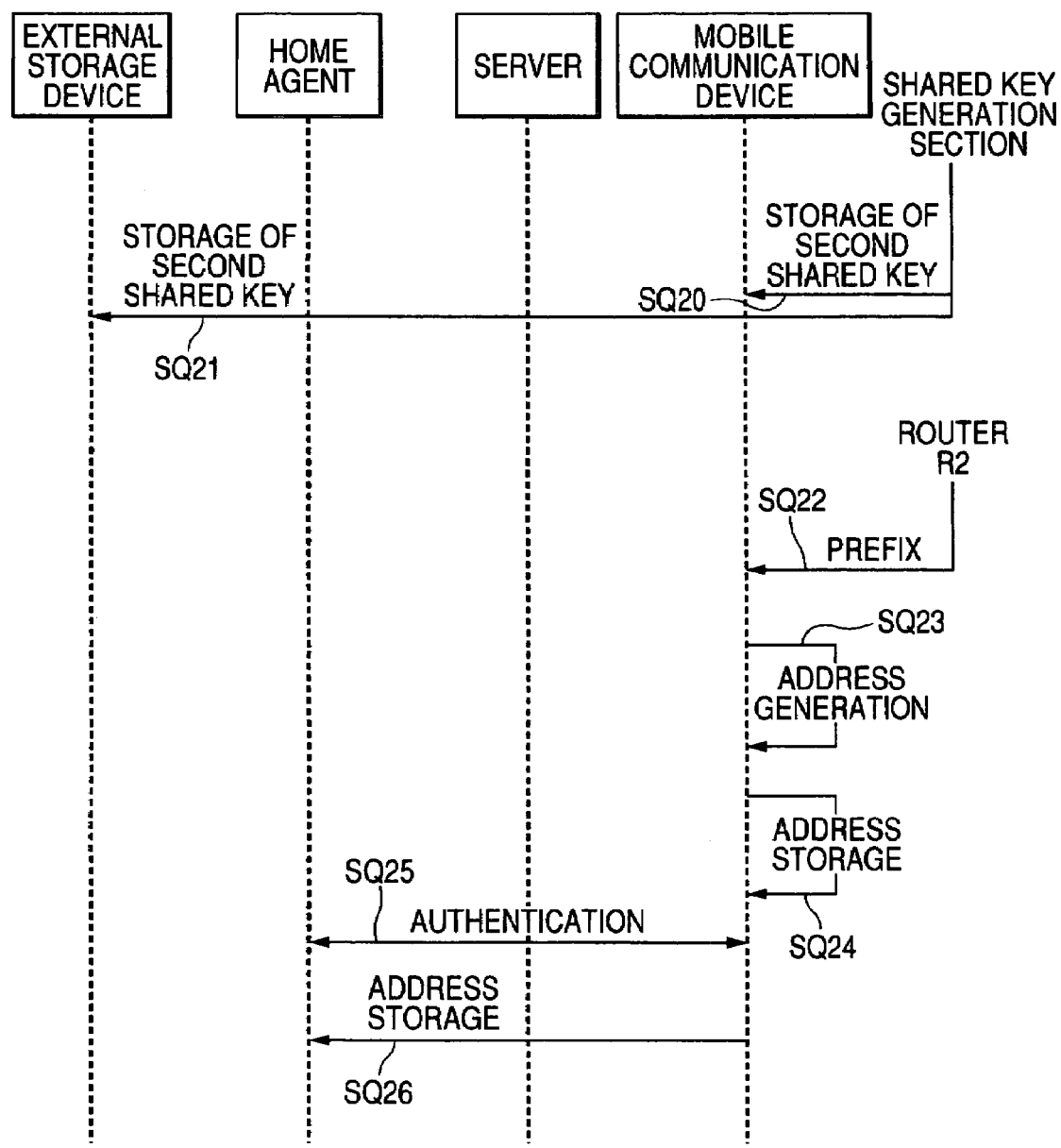
FIG. 12 is a chart to show an operation example of registering installation of the device 10 in a foreign network 200 in the system shown in FIG. 7.

In FIG. 12, the second shared key is stored in the external storage device 50 (SQ26), but the second shared key may be stored in the server 500 (SQ26B). At this time, the operation of transmitting a communication packet from the personal computer 30 to the device 10 connected to the foreign network 200 is as shown in FIG. 15.

Figure 15:
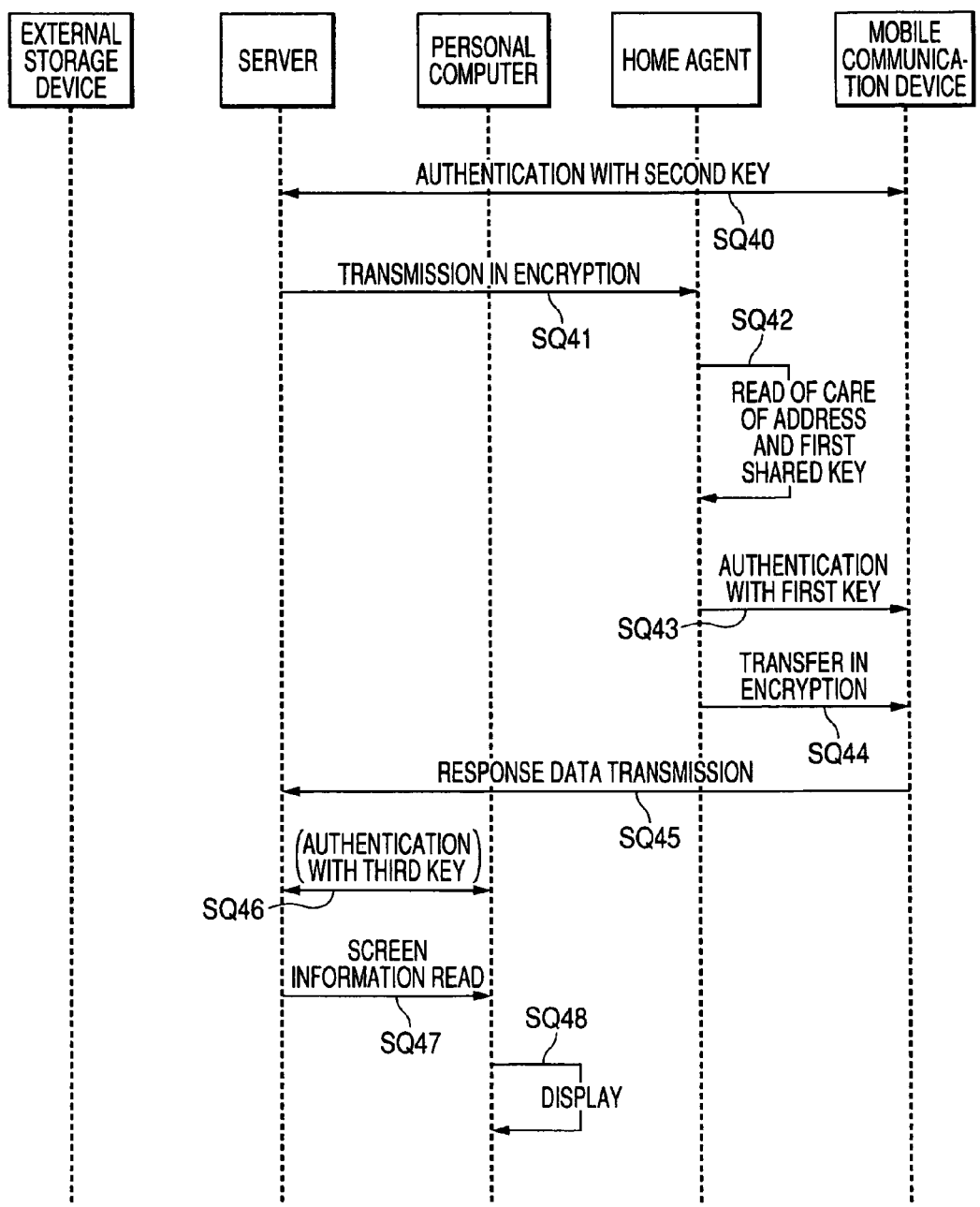
FIG. 15 is a chart to show another operation example in FIG. 13.

In FIG. 15, a first the authentication section 13 of the device 10 authenticates the server 500 based on the second shared key in the memory 11 and determines whether or not access to the server 500 is permitted (SQ40). Next, the communication packet is encrypted with the second shared key and the encrypted communication packet is transmitted to the home agent 20 (SQ41).

The home agent 20 receives the communication packet and determines the transfer destination of the communication packet and the first shared key for authentication from the correspondence between the home address and the care of address in the memory 21 (SQ42) and the transfer section 22 transmits the communication packet to the device 10 with the care of address as the destination. The authentication section 13 performs authentication between the device 10 and the home agent 20 (SQ43). The home agent 20 encrypts the communication packet from the server 500 with the first shared key in the memory 21. The transfer section 22 transfers the encrypted communication packet to the device 10 (SQ44).

The device 10 sends the information concerning the device to the server 500 (SQ45). The personal computer 30 starts the browser 31 and reads the HTML format file, the icon information, etc., of the selected device in the table 500B of the server 500 (SQ47) and displays the icon including the specific information of the device 10 along the description of the file (SQ48).

Authentication based on a third shared key may be performed between the device 10 and the server 500 (SQ46).

The invention is not limited to the embodiment and may be as follows: For example, the configuration wherein the home agent 20 is operated in a node different from the router R1 is shown, but the home agent 20 may be operated in the router The configuration wherein the address management section 40 is provided apart from the home agent 20 is shown, but the address management section 40 may be provided in the node where the home agent 20 operates.

The configuration wherein the second shared key is provided for the device 10 and the external storage device 50 is shown, but the second shared key need not be stored if security between the device 10 and the personal computer 30 to which the external storage device 50 is connected is guaranteed.

The configuration wherein mobile IPv6 is used as the communication protocol of the device 10 is shown, but mobile IPv4 may be used with a foreign agent installed in the foreign network 200.

The personal computer 30 may be provided with an IPv4-IPv6 tunnel means so that IPv4 is adopted for the personal computer 30 and IPv6 is adopted for the networks 200 and 400.

The external storage device 50 may be any device (for example, a floppy (registered trademark) disk, an SD card, MO, a CD, a CF card, etc.,) if it can be connected to the interface of the personal computer 30.

The configuration wherein the specific information, the home address, and the screen information are stored in the table 500B of the server 500 is shown, but the data of the specific information, the home address, and the screen information may be sent to the user after shipment of the device 10. For example, print paper of the data may be sent to the user by mail or FAX or electronic data of the specific information, the home address, and the screen information may be sent to the user. Accordingly, the flexibility of the timing at which the data is to be sent is increased and the flexibility of management of the home agent 20 and the address block including the home address is increased. Change in the address block can also be handled flexibly and the user can also use any desired memory device.

The configuration wherein the second shared key is stored in the device 10 and the external storage device 50 after shipment is shown, but the second shared key may be stored before shipment or at shipment of the device 10 and the external storage device 50. Accordingly, the user can be saved from having to store the second shared key.

Only one personal computer 30 and one device 10 are shown in the figures, but any number of personal computers 30 and any number of devices 10 may be installed. Likewise, any number of foreign networks 200 may be installed.

Further, the configuration wherein the serial number is used as the specific information of the device 10 is shown, but any specific information may be used if it is unique. The screen information generation section may create screen information associating a different name from the specific information with the specific information. Accordingly, the user can identify the device 10 according to the name unique to the user easier to manage than the serial number.

Third Embodiment

Figure 16:
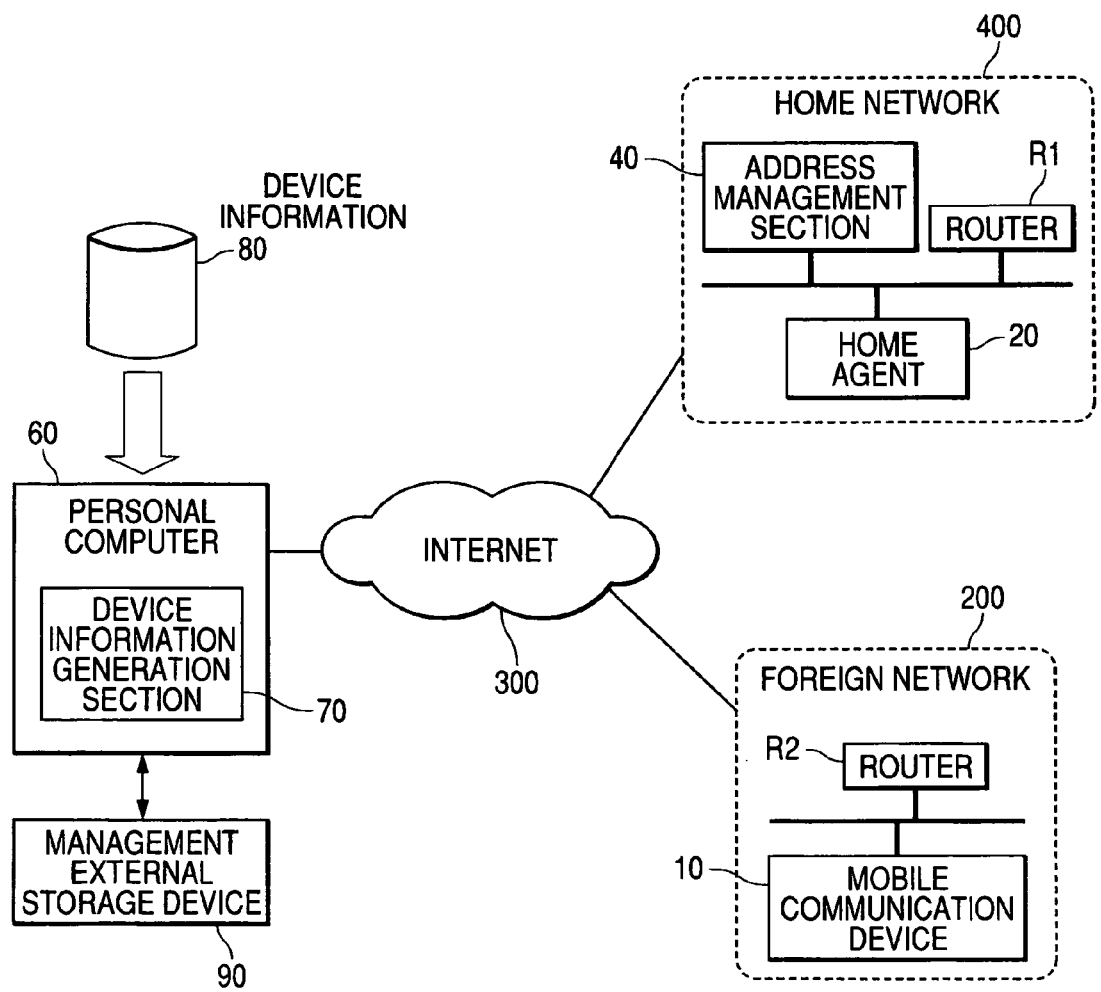
FIG. 16 is a block diagram to show a third embodiment of a mobile communication system according to the invention.

FIG. 16 is a block diagram to show a third embodiment of a mobile communication system according to the invention. In FIG. 16, the device provider provides the user with specific information associating the serial numbers and the home addresses of all delivered devices 10 with each other as device information 80. The device information 80 may be provided using media such as an FD, a CD, or a DVD or may be provided as it is previously stored in a server (not shown) and the data is acquired through a network.

A personal computer 60 includes a device information generation section 70 for acquiring the device information 80 provided by the device provider and grouping the device information 80 in response to the administration mode of the user. The generated data is subjected to processing of conversion to HTML, etc., in the device information generation section 70 and the data is stored in a management external storage device 90 connected to the personal computer 60.

Figure 17:
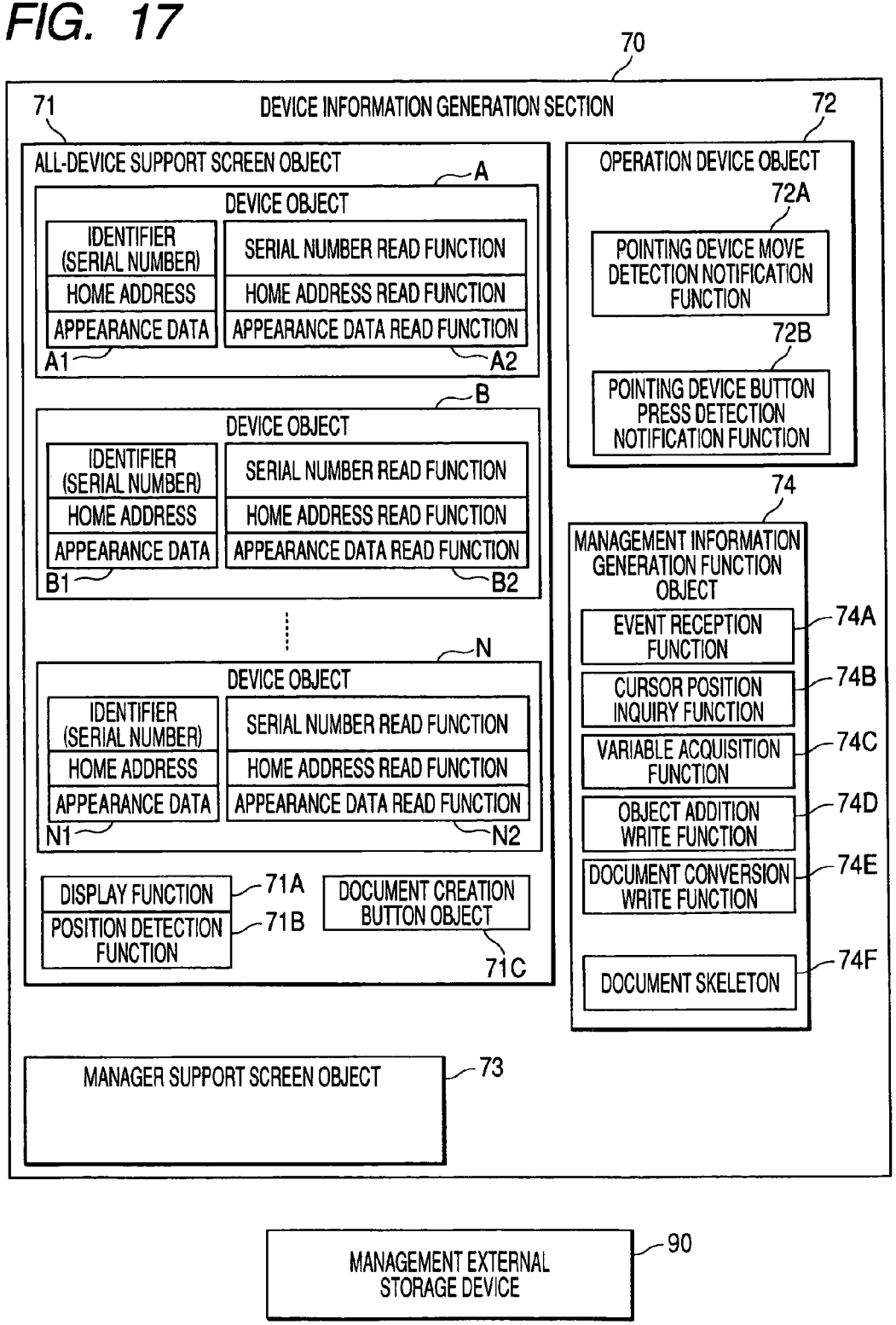
FIG. 17 is a block diagram to show an example of a device information generation section.

Next, the configuration of the device information generation section 70 is shown in FIG. 17 and the operation of the device information generation section 70 will be discussed with FIG. 16. The device information generation section 70 is implemented as software and includes an all-device support screen object 71, an operation device object 72, a manager support screen object 73, and a management information generation function object 74.

When the device information 80 is provided for the personal computer 60, the all-device support screen object 71 of the device information generation section 70 displays data of the device information 80 on a screen of the personal computer 60, for example. If the number of delivered devices 10 is N, the displayed data is device object A, device object B . . . device N object N.

Each of the device objects A to N is stored as a set of serial number, home address, and appearance data (A1 to N1) and a set of serial number read function, home address read function, and appearance data read function of reading the data (A2 to N2). The appearance data is, for example, an icon and includes the appearance having information to such a degree that the device can be determined.

The operation device object 72 is an object for operation detection of a pointing device (not shown) such as a cursor or a mouse being connected to the personal computer 60 for pointing to any desired position on the screen, for example, and makes a notification based on move and click operation of the pointing device.

Specifically, the operation device object 72 makes a notification of move of the pointing device by a pointing device move detection notification function 72A and when the user drags with the pointing device, detects and makes a notification of the dragging by a pointing device button press detection notification function 72B.

The manager support screen object 73 is an object for storing the device objects selected for grouping by the user from among the device 1 object A to the device N object N displayed in the all-device support screen object 71; for example, the user drags any desired one of device information icons displayed in the all-device support screen object 71 with a mouse (not shown) and drops the device information icon onto the manager support screen object 73.

The management information generation function object 74 includes an event reception function 74A, a cursor position inquiry function 74B, a variable acquisition function 74C, an object addition write function 74D, a document conversion write function 74E, a document skeleton 74F, etc., and is an object for controlling the operation among the all-device support screen object 71, the operation device object 72, and the manager support screen object 73.

An object of device information selected by move and click operation of the pointing device is stored in the manager support screen object 73. To further add device information to the manager support screen object 73, the user repeats move and click operation of the pointing device in order and objects of device information are added to the manager support screen object 73 as instructed by the object addition write function 74D.

The objects of device information stored in the manager support screen object 73 are read into the document conversion acquisition function 74C of the management information generation function object 74 as data and are converted into a predetermined format by the document conversion write function 74E for storage in the management external storage device 90.

As the stored data, data of a GUI to be displayed in a browser (not shown) operating in the personal computer 60 is stored; the data includes an HTMT format file of hypertext as screen information, icon information different in shape for each serial number, and the like. The HTMT format file also includes hyperlink information to the home address of the device 10.

Figure 18:
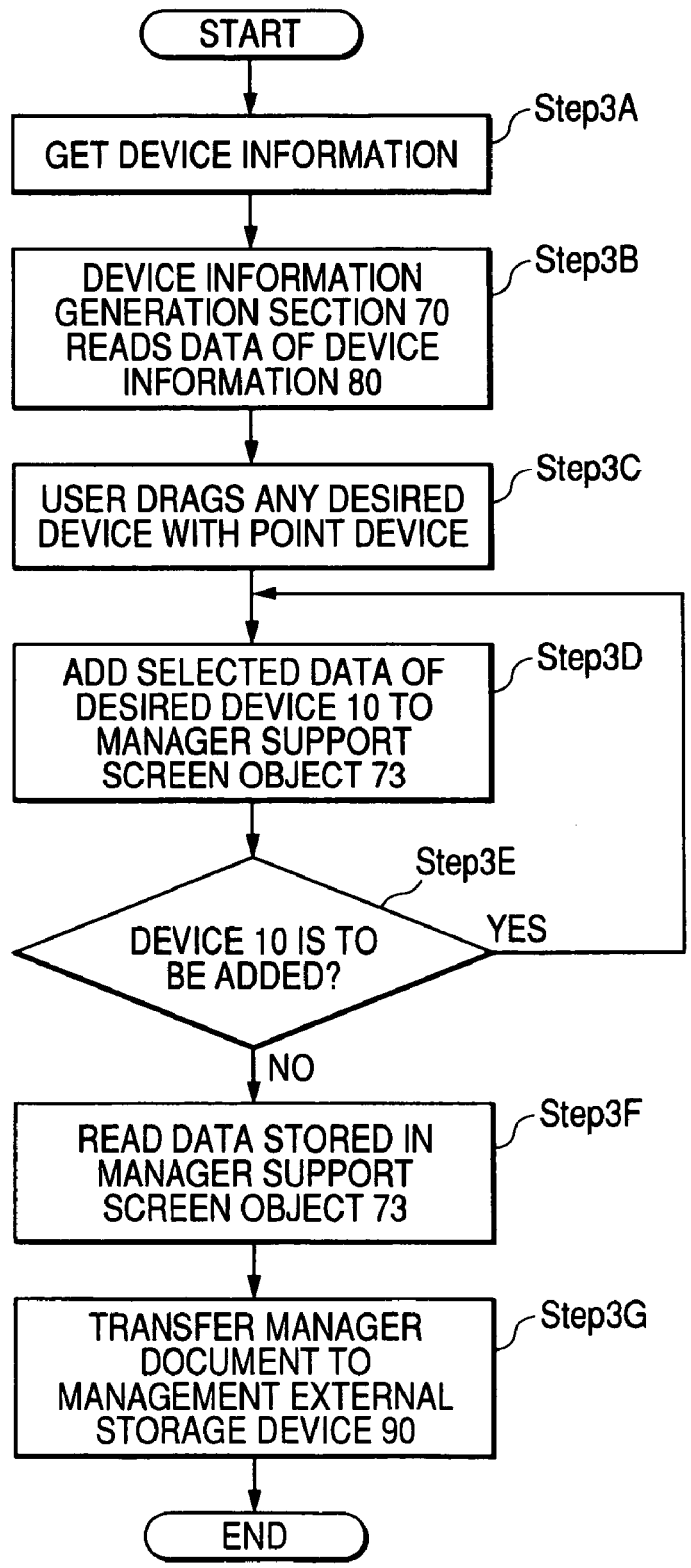
FIG. 18 is a flowchart to describe an example of the operation of the device information generation section.

Next, the operation of device information generation according to the invention will be discussed with a flowchart of FIG. 18. At step 3A in FIG. 18, the personal computer 60 gets or accesses gotten device information 80 of all devices 10. At step 3B, the device information generation section 70 inputs the device information 80 and displays the appearance data in the sets A1 to N1 of the devices 10 of the device information 80.

At step 3C, the user moves the pointing device to the position of the appearance data of any desired device 10 of the device objects displayed on the all-device support screen object 71 and drags. At this time, the position of the moved pointing device is detected by a position detection function 71B of the all-device support screen object 71 and is displayed by a display function 71A.

At step 3D, the dragged data of the desired device 10 is added to the manager support screen object 73. Specifically, the dragged data of the desired device 10, namely, the serial number and the home address are acquired by the variable acquisition function 74C of the management information generation function object 74 and are added to the manager support screen object 73 together with the appearance data.

For example, to drag the device 1 object A and add the data to the manager support screen object 73, the variable acquisition function 74C acquires the serial number, the home address, and the appearance data in set A1 stored in the device object A by the serial number read function, the home address read function, and the appearance data read function in set A2 in order and the object addition write function 74D adds the read data to the manager support screen object 73.

At step 3E, the processing is repeated for storing the data of all desired devices in the manager support screen object 73.

Next, at step 3F, the user clicks a button of the pointing device on a document creation button object 71C of the all-device support screen object 71, and the document conversion write function 74E reads the data stored in the manager support screen object 73. The document conversion write function 74E references the document skeleton 74F of the management information generation function object 74 and adds the read data to the skeleton for creating a manager document.

At step 3G, the created manager document is transferred to the management external storage device 90.

As the described operation is performed, for example, the user points to the appearance data of an icon, etc., with the cursor, etc., from the window displaying all devices and drags and drops any desired icon into the manager support screen window for storage. Upon completion of the storage, the user presses the document creation button, whereby a manager document is automatically created and is transferred to the management external storage device 90.

Figure 19:
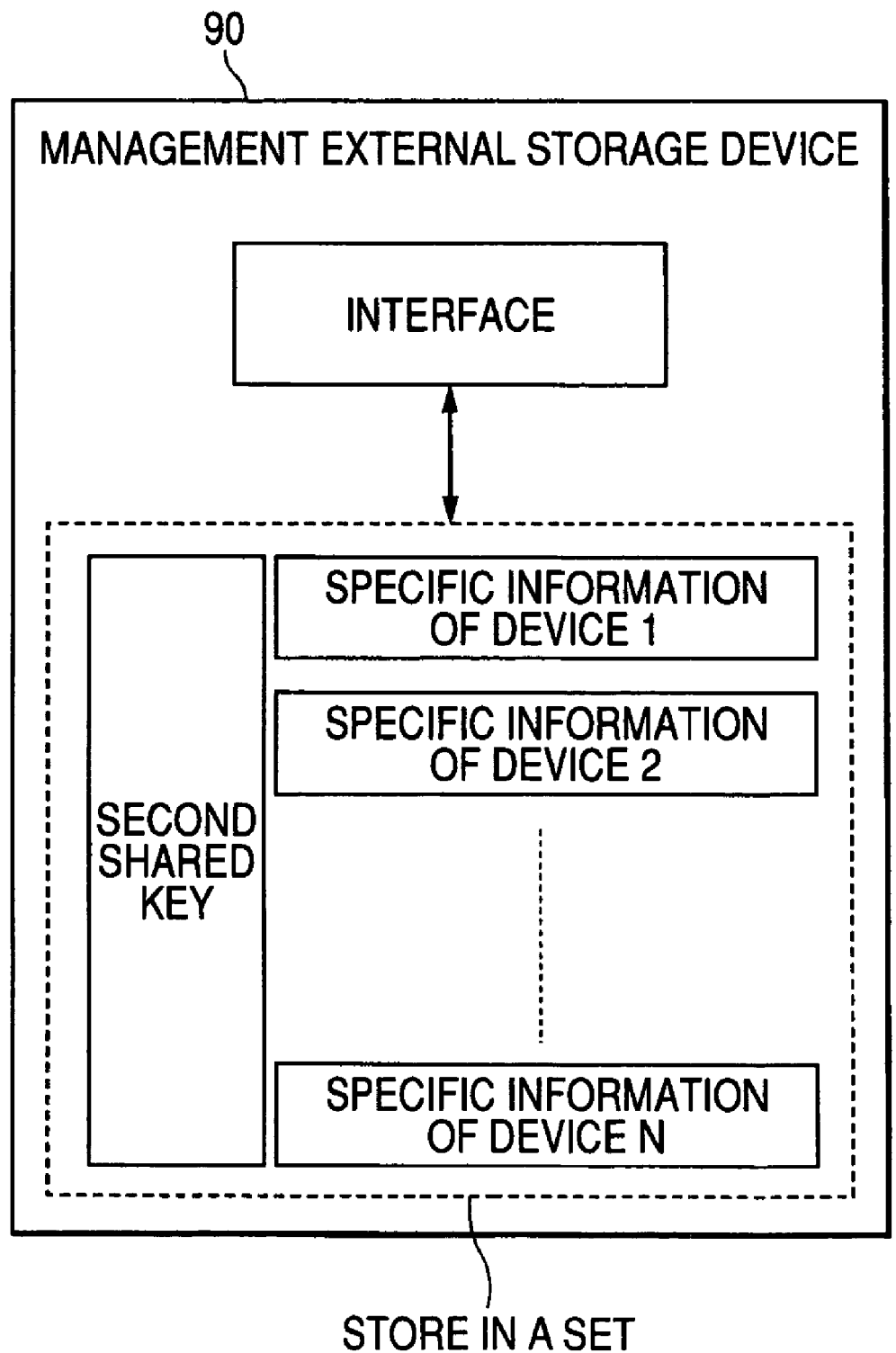
FIG. 19 is a block diagram to show an example of a management external storage device shown in FIG. 16.

FIG. 19 is a conceptual drawing to show storage of a plurality of pieces of data of the devices 10 in the management external storage device 90 in a set through a second shared key.

The configuration wherein the second shared key is provided for the device 10 and the management external storage device 90 is shown, but the second shared key need not be stored if security between the device 10 and the personal computer 60 to which the management external storage device 90 is connected is guaranteed.

In the description of the invention, the device information generation section is provided in the source node, but may be provided separately rather than in the source node. For example, in FIG. 16, the device information generation section 70 is included in the personal computer 60 and the device information 80 is inputted to the personal computer 60 for generating management information, but the device information generation section 70 may be provided as an independent device.

In this case, the device information 80 is read by the independent device and management information is stored in the management external storage device 90. The external storage device in which the generated management information is stored is connected to the personal computer 60 in FIG. 16 or a second personal computer separate from the personal computer 60 is provided and the external storage device is connected to the second personal computer for use as a source node.

What is claimed is:

1. A mobile communication system, comprising:
   a home agent which transfers a communication packet to a mobile communication device connected to a foreign network;
   an address management section which manages a plurality of IP addresses;
   an address generation section which assigns any of the IP addresses managed by the address management section to the mobile communication device as a home address thereof;
   a memory device which stores the home address of the mobile communication device and an identifier of the mobile communication device in association with each other; and
   a source node which transmits the communication packet to a mobile communication device having the home address stored in the memory device as a destination,
   wherein the memory device is configured for attachment to and detachment from the source node,
   the home agent and the mobile communication device share a first authentication key, the memory device and the mobile communication device share a second authentication key, and
   the mobile communication device comprises an authentication section which, upon receipt of the communication packet from the home agent, performs authentication of the home agent using the first key and authentication of the source node using the second key.

2. The mobile communication system according to claim 1, wherein the address management section manages an address block.

3. The mobile communication system according to claim 1, wherein the memory device stores screen information to be displayed on a browser in the source node.

4. The mobile communication system according to claim 3, wherein the screen information is hypertext and includes icon information associated with the identifier of the mobile communication device.

5. The mobile communication system according to claim 1, wherein the mobile communication device adopts mobile IP as a communication protocol.

6. A mobile communication method in a mobile communication system comprising a home agent which transfers a communication packet to a mobile communication device connected to a foreign network, the mobile communication method comprising the steps of:
   managing an address block by an address management section;
   assigning an IP address in the address block to the mobile communication device as a home address thereof;
   storing a home address in the home agent;
   storing a first shared key in the mobile communication device, and storing the first shared key in a memory of the home agent;
   storing a second shared key in the mobile communication device, and storing the second shared key and the home address and an identifier of the mobile communication device in a memory device in association with each other;
   transmitting a communication packet to the mobile communication device by a source node using the home address, the identifier, and the second shared key stored in the memory device;
   transferring the communication packet from the source node by the home agent;
   authenticating the home agent based on the first shared key stored in the mobile communication device by an authentication section of the mobile communication device; and
   authenticating the source node based on the second shared key stored in the mobile communication device by an authentication section of the mobile communication device, and starting communications with the source node.

7. A mobile communication system, comprising:
   a home agent which transfers a communication packet to a mobile communication device connected to a foreign network;
   an address management section which manages a plurality of IP addresses;

an address generation section which assigns any of the IP addresses managed by the address management section to the mobile communication device as a home address thereof;

a server which stores the home address of the mobile communication device and specific information of the mobile communication device in association with each other; and a source node which connects with the server through a network, and transmits the communication packet to any mobile communication device having the home addresses stored in the server as a destination, wherein the source node comprises an external storage device which stores information associated with the specific information stored in the server, the home agent and the mobile communication device share a first key, the source node and the mobile communication device share a second key, and the mobile communication device comprises an authentication section which performs authentication using the first key and the second key.

8. The mobile communication system according to claim 7, wherein the address management section manages an address block.

9. The mobile communication system according to claim 7, wherein the server comprises:

an HTTP server which operates in response to a request received from the source node;

a memory which stores a table in which the home address of the mobile communication device and the specific information of the mobile communication device are associated with each other; and a processing section which performs processing to display information concerning the mobile communication device selected as the destination on a browser in the source node.

10. The mobile communication system according to claim 7, wherein the external storage device stores the second key in association with the specific information of the mobile communication device stored in the server, and is configured for attachment to and detachment from the source node.

11. The mobile communication system according to claim 7, wherein the authentication section performs authentication using a third key shared by the source node and the server.

12. The mobile communication system according to claim 9, wherein the memory stores screen information to be displayed on the browser in the source node.

13. The mobile communication system according to claim 12, wherein the screen information is hypertext and includes icon information associated with the specific information of the mobile communication device.

14. The mobile communication system according to claim 7, wherein the mobile communication device adopts mobile IP as a communication protocol.

15. A mobile communication method in a mobile communication system comprising a home agent which transfers a communication packet to a mobile communication device connected to a foreign network, the mobile communication method comprising the steps of:

managing an address block by an address management section;

assigning an IP address in the address block to the mobile communication device as a home address thereof;

storing a home address in the home agent;

storing a first shared key in the mobile communication device, and storing the first shared key in a memory of the home agent;

storing a second shared key in the mobile communication device, storing specific information including the home address of the mobile communication device in a server in association, and storing the second shared key in a source node;

transmitting a communication packet to the mobile communication device by the source node using the home address and the specific information stored in the server and the second shared key stored in the source node;

transferring the communication packet from the source node by the home agent;

authenticating the home agent based on the first shared key stored in the mobile communication device by an authentication section of the mobile communication device; and authenticating the source node based on the second shared key stored in the mobile communication device by an authentication section of the mobile communication device, and starting communications with the source node.

16. A mobile communication system, comprising:

a home agent which transfers a communication packet to a mobile communication device connected to a foreign network;

an address management section which manages a plurality of IP addresses;

an address generation section which assigns any of the IP addresses managed by the address management section to the mobile communication device as a home address thereof;

an external storage device which stores device information of the mobile communication device; and a source node which transmits the communication packet to a mobile communication device having the home address included in the device information stored in the external storage device as a destination, wherein the source node comprises a device information generation section which obtains device information of a plurality of mobile communication devices, selects any device information to group the selected device information, and stores the grouped device information in the external storage device, and the device information generation section comprises:

an all-device support screen object which displays device information obtained by the device information generation section;

an operation device object which selects any desired device information among the displayed device information;

a manager support screen object which stores the selected device information; and a management information generation function object which controls an operation of the operation device object for the all-device support screen object and the manager support screen object, and stores the device information stored in the manager support screen object in the external storage device according to an instruction.

17. The mobile communication system according to claim 16, wherein the device information has a home address for each mobile communication device and an identifier and appearance data associated with the home address, and is data collectively provided from an outside.

18. The mobile communication system according to claim 16, wherein the all-device support screen object lists appearance data of the obtained device information.

19. The mobile communication system according to claim 18, wherein the operation device object comprises:

a pointing device move detection notification section which detects a move of a pointing device; and a pointing device button press detection notification section which detects a pointing device button being pressed, and wherein the pointing device is moved onto the appearance data displayed on the all-device support screen object and the button is pressed to move the device information including the appearance data, so that the device information is stored on the manager support screen object.

* * * * *